US008082389B2

(12) United States Patent
Fujibayashi et al.

(10) Patent No.: US 8,082,389 B2
(45) Date of Patent: Dec. 20, 2011

(54) APPARATUS AND METHOD FOR MIRRORING DATA BETWEEN NONVOLATILE MEMORY AND A HARD DISK DRIVE

(75) Inventors: Akira Fujibayashi, Sagamihara (JP);
Shuji Nakamura, Machida (JP);
Kazuhisa Fujimoto, Koganei (JP)

(73) Assignee: Hitachi, Ltd., Tokyo (JP)

( * ) Notice: Subject to any disclaimer, the term of this patent is extended or adjusted under 35 U.S.C. 154(b) by 28 days.

(21) Appl. No.: 12/649,804

(22) Filed: Dec. 30, 2009

(65) Prior Publication Data
US 2010/0106903 A1 Apr. 29, 2010

Related U.S. Application Data

(63) Continuation of application No. 11/563,849, filed on Nov. 28, 2006, now Pat. No. 7,669,019.

(30) Foreign Application Priority Data

Oct. 11, 2006 (JP) ................................. 2006-277102

(51) Int. Cl.
*G06F 12/16* (2006.01)
(52) U.S. Cl. ................... 711/112; 711/103; 711/162
(58) Field of Classification Search ........................ None
See application file for complete search history.

(56) References Cited

U.S. PATENT DOCUMENTS

| 7,461,196 | B2 | 12/2008 | Kawamura et al. | |
|---|---|---|---|---|
| 2004/0054939 | A1 | 3/2004 | Guha et al. | |
| 2004/0111558 | A1 | 6/2004 | Kistler | |
| 2005/0172074 | A1* | 8/2005 | Sinclair | 711/114 |
| 2006/0259795 | A1* | 11/2006 | Tsai et al. | 713/300 |
| 2007/0271434 | A1 | 11/2007 | Kawamura et al. | |
| 2008/0147964 | A1 | 6/2008 | Chow et al. | |

FOREIGN PATENT DOCUMENTS

| EP | 1647983 | 4/2006 |
|---|---|---|
| JP | 2000207137 | 7/2000 |
| JP | 2004-164193 | 6/2004 |
| JP | 2006260008 | 9/2006 |
| WO | 2005081093 | 9/2005 |

OTHER PUBLICATIONS

"Power-efficient Server-class Performance from Arrays of Laptop Disks" by A. Papathanasiou, et al. Jun. 2004, pp. 1-2.
"The Case for Massive Arrays of Idle Disks (MAID)" by Dennis Colarelli, et al., Jan. 2002, pp. 1-6.
Japanese Office Action dated Jun. 21, 2011, issued in corresponding Japanese Patent Application No. 2006-277102 with partial English language translation.

* cited by examiner

*Primary Examiner* — Than Nguyen
(74) *Attorney, Agent, or Firm* — Brundidge & Stanger, P.C.

(57) ABSTRACT

This storage apparatus that provides to a host computer a logical device for storing data sent from the host computer includes a nonvolatile memory for storing the data, a disk-shaped memory device for storing the data, and a controller for controlling the nonvolatile memory and the disk-shaped memory device. The controller redundantly configures the logical device with the nonvolatile memory and the disk-shaped memory device.

8 Claims, 23 Drawing Sheets

FIG.8

| MANAGEMENT ID | HLDEV ID | LDEV ID | VDEV ID | DEV ID | DEV EXTENT |
|---|---|---|---|---|---|
| 0 | 1 | 001 | 001 | 1001 | 0h,4FFFFh |
| 1 | 1 | 003 | 005 | 1003 | 0h,4FFFFh |
| 2 | 2 | 002 | 004 | 1004 | 0h,3FFFFh |
| 3 | 2 | 005 | 003 | 1005 | 0h,3FFFFh |
| 4 | 4 | 004 | 002 | 004 | 0h,9FFFFh |
| 5 | 4 | 006 | 009 | 003 | 40000h,7FFFFh |
| 6 | 4 | 006 | 008 | 005 | 0h,6FFFFh |
| 7 | 5 | 007 | 007 | 007 | 0h,6FFFFh |
| 8 | 5 | 008 | 008 | 008 | 0h,6FFFFh |
| ⋮ | ⋮ | ⋮ | ⋮ | ⋮ | ⋮ |

FIG.9

| MANAGEMENT ID | HLDEV ID | LDEV ID | VDEV ID | DEV ID | OPERATING TIME SETTING | LAST ON TIME | LAST OFF TIME | PRIORITY READ PROCESSING CONFIRMATION | RUNNING STATE CONFIRMATION |
|---|---|---|---|---|---|---|---|---|---|
| 0 | 1 | 001 | 001 | 1001 | - | - | - | FM PRIORITY | - |
| 1 | 1 | 003 | 005 | 1003 | 4h | T0 | T1 | | OFF |
| 2 | 2 | 002 | 004 | 1004 | - | - | - | FM PRIORITY | - |
| 3 | 2 | 005 | 003 | 1005 | 8h | T2 | T3 | | ON |
| 4 | 4 | 004 | 002 | 004 | - | - | - | | - |
| 5 | 4 | 006 | 009 | 003 | 8h | T4 | T5 | HDD PRIORITY | ON |
| 6 | 4 | 006 | 008 | 005 | 8h | T6 | T7 | | ON |
| 7 | 5 | 007 | 007 | 007 | - | - | - | FM PRIORITY | - |
| 8 | 5 | 008 | 008 | 008 | 6h | T8 | T9 | | OFF |
| ⋮ | ⋮ | ⋮ | ⋮ | ⋮ | ⋮ | ⋮ | ⋮ | ⋮ | ⋮ |

| MANAGEMENT ID | HLDEV ID | READ COUNT | WRITE COUNT |
|---|---|---|---|
| 1 | 1 | 12000 | 1110 |
| 2 | 4 | 5500 | 13004 |
| ⋮ | ⋮ | ⋮ | ⋮ |

| MANAGEMENT ID | HLDEV ID | LDEV ID | READ COUNT | WRITE COUNT |
|---|---|---|---|---|
| 1 | 1 | 001 | 10000 | 10 |
| 2 | 1 | 003 | 2000 | 1100 |
| 3 | 4 | 004 | 5000 | 3000 |
| 4 | 4 | 006 | 500 | 10004 |
| ⋮ | ⋮ | ⋮ | ⋮ | ⋮ |

FIG.12

| MANAGEMENT ID | DEV ID | PHYSICAL DEVICE ID | TOTAL WRITE COUNT | TOTAL DELETE COUNT | NUMBER OF DEFECTIVE BLOCKS | INCREASE RATIO OF DEFECTIVE BLOCKS | AVERAGE DELETION TIME | ON/OFF COUNT | TOTAL OPERATING TIME |
|---|---|---|---|---|---|---|---|---|---|
| 1 | 1001 | 1001 | 20000 | 200 | 2 | 0.001 | 2ms | - | 5000 |
| 2 | 007 | 007 | 10000 | 300 | 2 | 0.001 | 2ms | - | 6500 |
| 3 | 1004 | 1004 | 10000 | 200 | 2 | 0.0005 | 2ms | - | 6000 |
| 4 | 1010 | 1010 | 5000 | 100 | 1 | 0.001 | 2ms | - | 5200 |
| 5 | 004 | 004 | 8000 | 100 | 1 | 0.001 | 2ms | - | 5200 |
| 6 | 004 | 2001 | 2000 | 200 | 2 | 0.001 | 2ms | - | 1000 |
| 7 | 004 | 2002 | 1000 | 300 | 2 | 0.001 | 2ms | - | 1500 |
| 8 | 004 | 2003 | 1000 | 200 | 2 | 0.0005 | 2ms | - | 1000 |
| 9 | 004 | 2004 | 500 | 100 | 1 | 0.001 | 2ms | - | 200 |
| 10 | 004 | 003 | - | - | 10 | 0.007 | - | 750 | 3000 |
| 11 | 1003 | 010 | - | - | 15 | 0.005 | - | 1000 | 4500 |
| 12 | 1003 | 005 | - | - | 1 | 0.001 | - | 1000 | 4000 |
| 13 | 1005 | 020 | - | - | 5 | 0.006 | - | 2000 | 5000 |
| 14 | 1005 | 003 | - | - | 10 | 0.007 | - | 750 | 3000 |
| 15 | 003 | 025 | - | - | 20 | 0.009 | - | 1000 | 3500 |
| 16 | 003 | 005 | - | - | 1 | 0.001 | - | 1000 | 4000 |
| 17 | 005 | 015 | - | - | 3 | 0.004 | - | 800 | 5000 |
| 18 | 005 | 008 | - | - | 1 | 0.001 | - | 1000 | 4000 |
| 19 | 008 | 015 | - | - | 3 | 0.004 | - | 800 | 5000 |
| 20 | 008 | 3004 | - | - | 2 | 0.001 | - | 1500 | 6000 |
| 21 | 008 | 3005 | - | - | 10 | 0.007 | - | 750 | 3000 |
| 22 | 008 | 3006 | - | - | 1 | 0.001 | - | 1000 | 4000 |

606, 607

APPARATUS AND METHOD FOR MIRRORING DATA BETWEEN NONVOLATILE MEMORY AND A HARD DISK DRIVE

CROSS REFERENCES

This application relates to and claims priority from Japanese Patent Application No. 2006-277102, filed on Oct. 11, 2006, and is a continuation of application Ser. No. 11/563,849, filed Nov. 28, 2006 now U.S. Pat. No. 7,669,019, the entire disclosures of which are incorporated herein by reference.

BACKGROUND

The present invention generally relates to a storage apparatus and its control method, and, for instance, can be suitably applied to a storage apparatus that drives one or more hard disk drives for storing data.

In recent years, demands from job sites of information business such as data centers for storing data reliably and on a long-term basis are increasing. For example, the law prohibits the deletion of document data of financial institutions and medical institutions, and such data must be accumulated.

Under these circumstances, a highly reliable large-capacity storage system is required. With a large-scale storage system using hard disk drives, generally speaking, power consumption will increase in proportion to the storage capacity. In other words, to own a large-capacity storage system means increase in the power consumption.

Nevertheless, storage systems are constantly demanded of reliable and long-term storage of data as well as further reduction of power consumption. In light of these circumstances, when it is necessary to accumulate large volumes of data and in certain cases to store such data for a long period of time, storage of data in an appropriate storage position in response to various demands sought in the stored data is effective in reducing the power consumption of the overall storage system.

Incidentally, as conventional art in this kind of technical field, for instance, Non-Patent Document 1 ("Power-efficient Server-class Performance from Arrays of Laptop Disks", Athanasios E. Papathanasiou and Michael L. Scott, The University of Rochester, Computer Science Department, Rochester, N.Y. 14627, Technical Report 837, May 2004 [URL searched on Sep. 25, 2006] http://www.cs.rochester.edu/u/papathan/papers/2004-usenix04/usenix04-wip/papathan-usenix04-wip-summary.pdf) proposes technology of shutting off the hard disk drive during normal times, and operating the hard disk drive corresponding to a data storage extent upon receiving an I/O request from a host system.

In addition, Patent Document 1 (Specification of U.S. Patent Application No. 2004/0054939) and Non-Patent Document 2 ("The Case for Massive Arrays of Idle Disks (MAID)", Dennis Colarelli, Dirk Grunwald and Michael Neufeld, University of Colorado, Boulder, FAST'02, USENIX [URL searched on Sep. 25, 2006] http://www.usenix.org/publications/library/proceedings/fast02/wips/colarelli.pdf) propose a storage system applying MAID (Massive Arrays of Idle Disks) technology for realizing a storage system of low power consumption.

Moreover, in recent years, a flash memory is attracting attention as a nonvolatile memory. A flash memory is generally of a power consumption that is several ten times lower in comparison to a hard disk drive, and enables high-speed reading. Further, a flash memory can be configured in a compact size since it does not require a mechanical drive unit as in a hard disk drive, and the tolerance against malfunctions is generally high.

Nevertheless, a flash memory has a limited write cycle due to physical reasons of the cells retaining the information. To overcome this kind of limitation, technology referred to as wear-leveling adjustment for retaining the correspondence of the address and cell position to be indicated to the host system and equalizing the number of writings into the respective cells is used to seek improvement in the write cycle of the flash memory. Incidentally, the elemental device for retaining information is hereinafter simply referred to as a "flash memory", and the elemental device including a mechanism for performing the foregoing wear-leveling adjustment and protocol processing to the host system is hereinafter referred to as a "flash memory device".

With a flash memory device, although efforts are being made to seek the efficiency in the write cycle restrictions with the foregoing technology, this does not mean that the restrictions on the write cycle will be completely eliminated. In addition, when an operation referred to as deletion is required during the writing [of data] into the flash memory, this process is performed at roughly the same speed as a hard disk drive.

Incidentally, as conventional art in this kind of technical field, for instance, Patent Document 2 (Japanese Patent Laid-Open Publication No. 2004-164193) proposes a storage system of switching the flash memory and the hard disk drive during a failure in a hybrid hard disk drive.

Nevertheless, with the storage system of Non-Patent Document 1, since the hard disk drive is operated after receiving the I/O request, there is a problem in that a delay in the response time will arise until the storage system replies to the host system, whereby the access performance will deteriorate.

Further, Patent Document 1 and Non-Patent Document 2 are limiting their application to storage systems that will not encounter any problems even when the access performance deteriorates, and do not give any consideration to a technological solution for the deterioration in the access performance. Thus, they do not realize the simultaneous pursuit of low power consumption and maintenance of high access performance.

In addition, although Patent Document 2 proposes the switching of the flash memory and the hard disk drive when a failure occurs in the hybrid hard disk drive, it does not realize the simultaneous pursuit of low power consumption and maintenance of high access performance.

Accordingly, it is necessary to realize a storage system capable of reducing power consumption while maintaining high access performance which could not be achieved with the conventional technology described above. In particular, although data centers and the like are increasingly demanding lower power consumption, it would be meaningless to lower the power consumption with a method that would deteriorate the access performance that is originally required.

Thus, the task would be to provide a storage system that applies a flash memory to realize the simultaneous pursuit of low power consumption and maintenance of high access performance that could not be achieved by conventional technology.

SUMMARY

The present invention was made in view of the foregoing points. Thus, an object of the present invention is to propose a storage apparatus and its control method capable of reducing power consumption while maintaining [high] access performance.

In order to achieve the foregoing object, the present invention proposes a storage apparatus that provides to a host computer a logical device for storing data sent from the host computer. This storage apparatus comprises a nonvolatile memory for storing the data, a disk-shaped memory device for storing the data, and a controller for controlling the nonvolatile memory and the disk-shaped memory device. The controller redundantly configures the logical device with the nonvolatile memory and the disk-shaped memory device.

Accordingly, by using a storage extent of a nonvolatile memory while maintaining the high access performance of the storage system, it is possible to reduce the power consumption, prolong the duration of the nonvolatile memory and the disk-shaped memory device, and optimize the access performance.

The present invention further proposes a control method of a storage apparatus that provides to a host computer a logical device for storing data sent from the host computer. This control method comprises a first step of redundantly configuring the logical device with the nonvolatile memory for storing the data and the disk-shaped memory device for storing the data.

Accordingly, by using a storage extent of a nonvolatile memory while maintaining the high access performance of the storage system, it is possible to reduce the power consumption, prolong the duration of the nonvolatile memory and the disk-shaped memory device, and optimize the access performance.

According to the present invention, the logical device is redundantly configured with the nonvolatile memory for storing the data and the disk-shaped memory device for storing the data. Thus, by using a storage extent of a nonvolatile memory while maintaining the high access performance of the storage system, it is possible to reduce the power consumption, prolong the duration of the nonvolatile memory and the disk-shaped memory device, and optimize the access performance. It is thereby possible to realize a storage apparatus and its control method capable of reducing power consumption while maintaining [high] access performance.

DESCRIPTION OF DRAWINGS

FIG. 8 is a conceptual diagram explaining a configuration management table;

FIG. 9 is a conceptual diagram explaining a HLDEV internal device running interval management table;

FIG. 12 is a conceptual diagram explaining a physical device status management table;

DETAILED DESCRIPTION

An embodiment of the present invention is now explained in detail with reference to the attached drawings.

Figure 1:
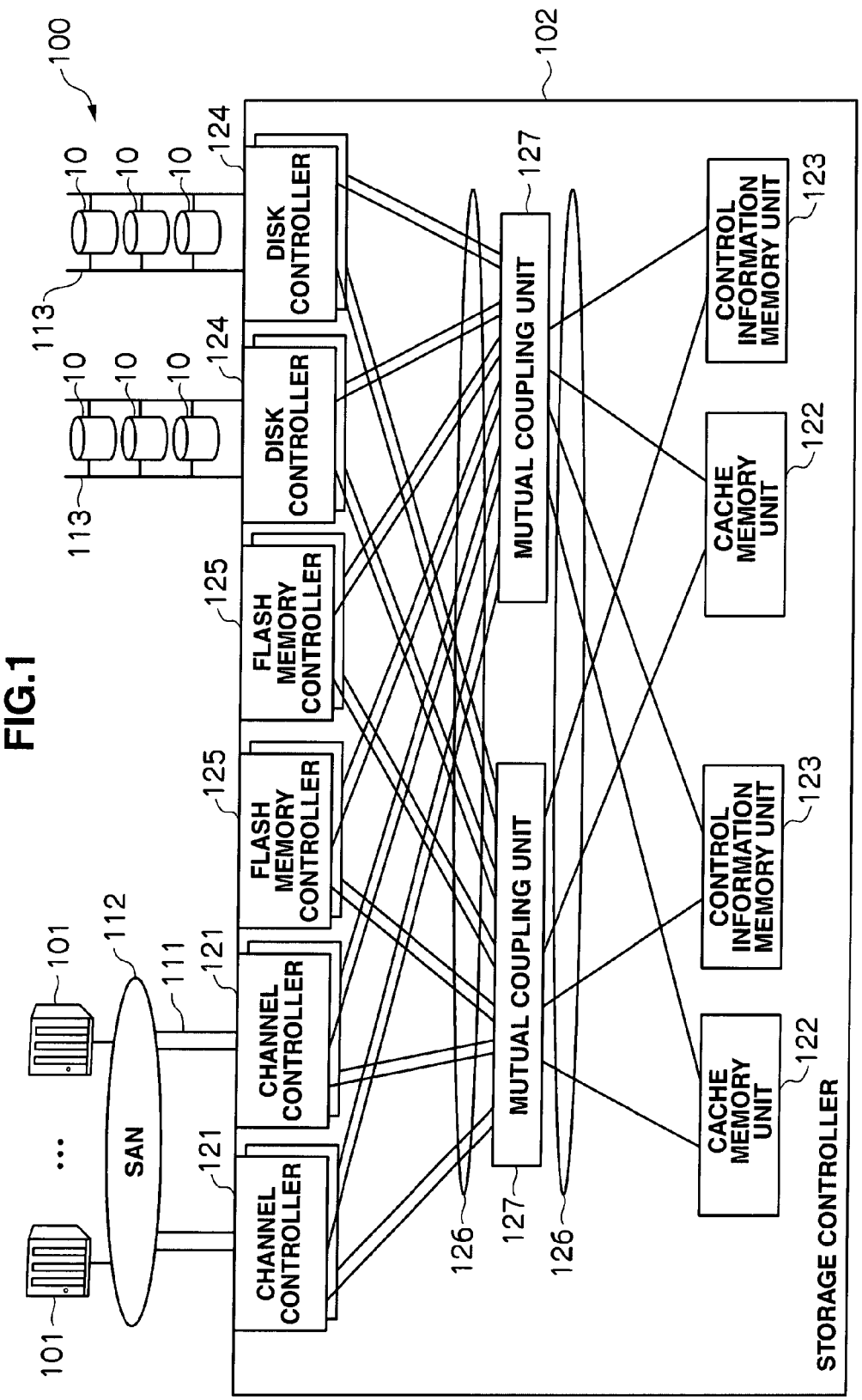
FIG. 1 is a block diagram showing a schematic configuration of a storage system according to an embodiment of the present invention.

FIG. 1 is a block diagram showing the configuration of a storage system 100 according to an embodiment of the present invention. The storage system 100 is configured from a host computer 101, a storage controller 102, and a hard disk drive (HDD) 103.

The storage controller 102 is generally connected to one or more host computers 101 via a SAN (Storage Area Network) 112 configured from a SAN switch or the like through a channel 111. The storage controller 102 is also connected to a plurality of hard disk drives 103 storing data through a disk-side channel 113.

Further, the storage controller 102 is configured from a plurality of channel controllers 121, a plurality of memory units 122, 123, a plurality of disk controllers 124, a plurality of flash memory controllers 125, and a mutual coupling unit 127 connecting these components via an internal bus 126.

The channel controllers 121 receive an I/O request from the host computer 101 through the channel 111, interpret the type of request (i.e., whether it is a read request or a write request) and target address of the I/O request, and perform the various processing routines described with reference to FIG. 15 onward.

There are several types of information to be stored in the memory units 122, 123, and physically different memories can be prepared for each type of information, or such memories may be logically used as appropriate. In this embodiment, a case is explained where an extent as a cache memory is allocated to the memory unit 122, and an extent as a control information storage extent is allocated to the memory unit 123. Herebelow, the memory unit 122 is referred to as a cache memory unit 122, and the memory unit 123 is referred to as a control information memory unit 123.

The cache memory unit 122 temporarily stores data to be stored in the hard disk drives 103 or a flash memory (FM) 405 (described later), and data to be sent to the host computer 101. The control information memory unit 123 stores directory information of a memory extent to be used as a cache memory, and control information such as configuration information of the storage system 100.

The disk controllers 124 control the hard disk drives 103 through the disk-side channel 113 based on a request from the channel controller 121 or the like, and perform the extraction or storage of data as requested by the host computer 101. Thereupon, the disk controllers 124 may subject the hard disk drives 103 to RAID (Redundant Arrays of Independent Disks) control so as to improve the reliability, availability and performance of the storage system.

The flash memory controller 125 controls a flash memory 405 (described later). The flash memory controller 125 performs the extraction or storage of data requested by the host computer 101 from or into the flash memory 405 based on a request from the channel controller 121 or the like. Thereupon, the flash memory controller 125 may subject the flash memory 405 to RAID control so as to improve the reliability, availability and performance of the storage system. Incidentally, although the storage system 100 is connected to the hard disk drives 103 in this embodiment, the [storage system 100] may be configured without the hard disk drives 103 and the disk controllers 124.

Figure 2:
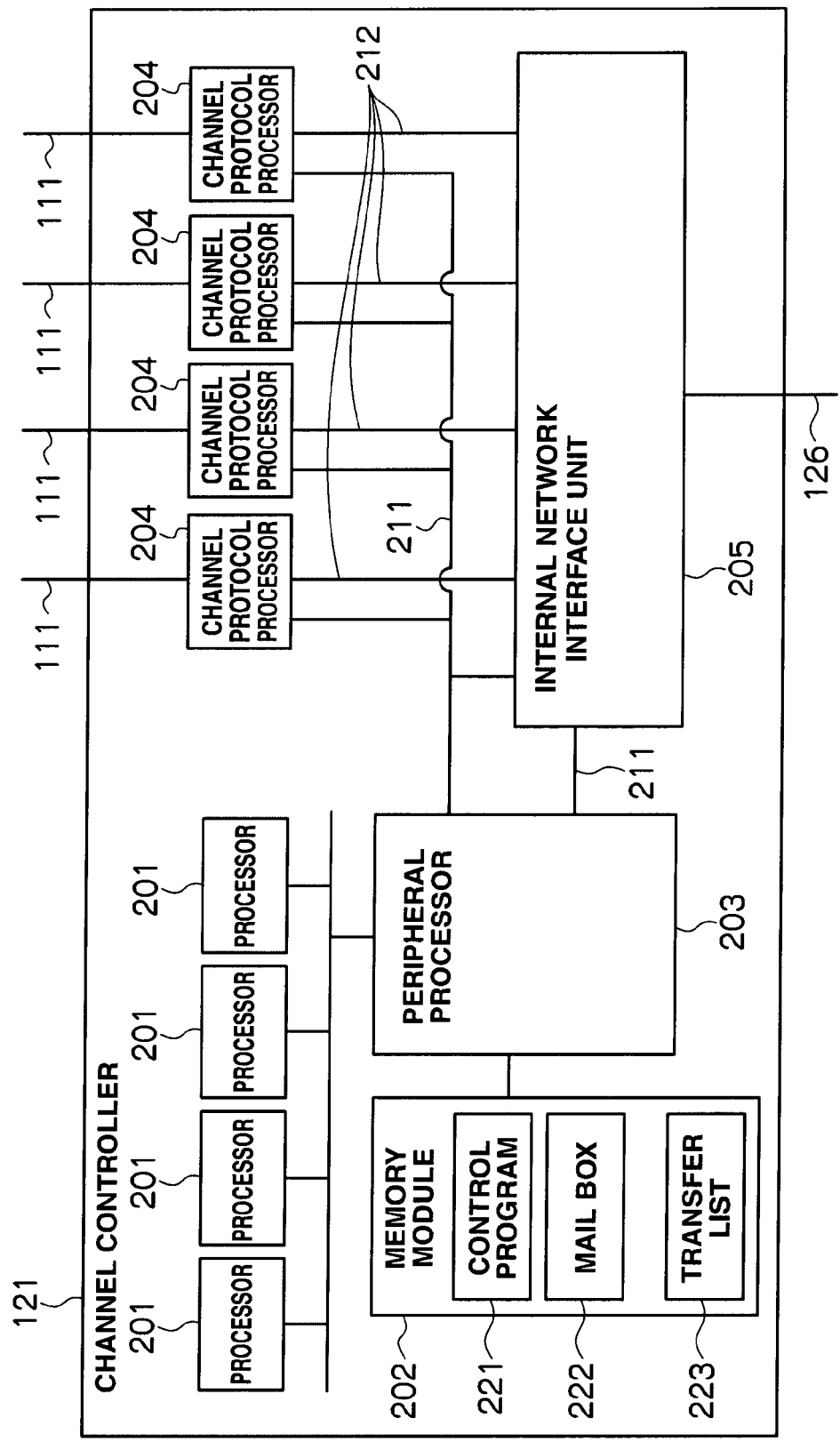
FIG. 2 is a block diagram showing a schematic configuration of a channel controller.

FIG. 2 is a block diagram showing a detailed configuration of the channel controller 121. The channel controller 121 is configured from a plurality of processors 201, a memory module 202, a peripheral processing unit 203, a plurality of channel protocol processing units 204, and an internal network interface unit 205.

The processor 201 is connected to the peripheral processing unit 203 with a connection means such as a bus. The peripheral processing unit 203 is connected to the memory module 202 and controls the memory module 202. Further, the processor 201 is connected to the channel protocol processing unit 204 and the internal network interface unit 205 via a control bus 211. The peripheral processing unit 203 receives packets from the connected processor 201 and the channel protocol processing unit 204 and the internal network interface unit 205, performs such processing if the forwarding address shown on the packet is in the memory module 202, and returns data as necessary. Moreover, the peripheral processing unit 203 performs appropriate forwarding if the forwarding address is located elsewhere.

The memory module 202 has a control program 221 for controlling the channel controller 121, a mailbox 222 for another processor 201 to communicate with the processor 201 connected to the peripheral processing unit 203, and a transfer list 223 for the channel protocol processing unit 204 to perform DMA (Direct Memory Access).

The processor 201 accesses the memory module 202 through the peripheral processing unit 203, and performs processing based on the control program 221 stored in the memory module 202.

The channel protocol processing unit 204 performs protocol control in the channel 111, and changes the protocol to a protocol system that enables processing inside the storage system 100. Further, when the channel protocol processing unit 204 receives an I/O request from the host computer 101 through the channel 111, it notifies the host computer number, LUN (Logical Unit Number), access destination address and so on of the I/O request to the processor 201.

The processor 201 accesses the directory information in the control information extent or the directory information replicated and deployed in the memory module 202 based on a notification from the channel protocol processing unit 204, creates a transfer list 223 in the memory module 202 when there is an address for storing data of the I/O request, or data of the I/O request, and makes the channel protocol processing unit 204 transfer data based on such transfer list 223.

Further, when read-target data requested by the host computer does not exist in the cache memory unit 122 and is stored in the hard disk drive 103, the processor 201 commands the disk controller 122 to store the requested data stored in the hard disk drive 103 into the cache memory unit 122 (this operation is called staging), thereafter creates the transfer list 223 in the memory module 202, and makes the channel protocol processing unit 204 transfer data based on such transfer list 223.

Further, when read-target data requested by the host computer does not exist in the cache memory unit 122 and is stored in the flash memory 405, the processor 201 sets the address of the flash memory 405 in the transfer list 223. The transfer list 223 is a list of addresses in the cache memory unit 122 or the flash memory 405.

If the I/O request is a write request, the processor 201 writes the data from the host computer 101 into an address listed in the transfer list 223 through the internal network interface unit 205 connected via the data transfer system bus 212. Further, if the I/O request is a read request, the processor 201 similarly reads the data from an address listed in the transfer list 223, and sends this data to the host computer 101.

The internal network interface unit 205 is a component to become an interface upon communicating the respective constituent elements inside one's own channel controller 121 and inside other storage systems 100 via the internal bus 126.

Figure 3:
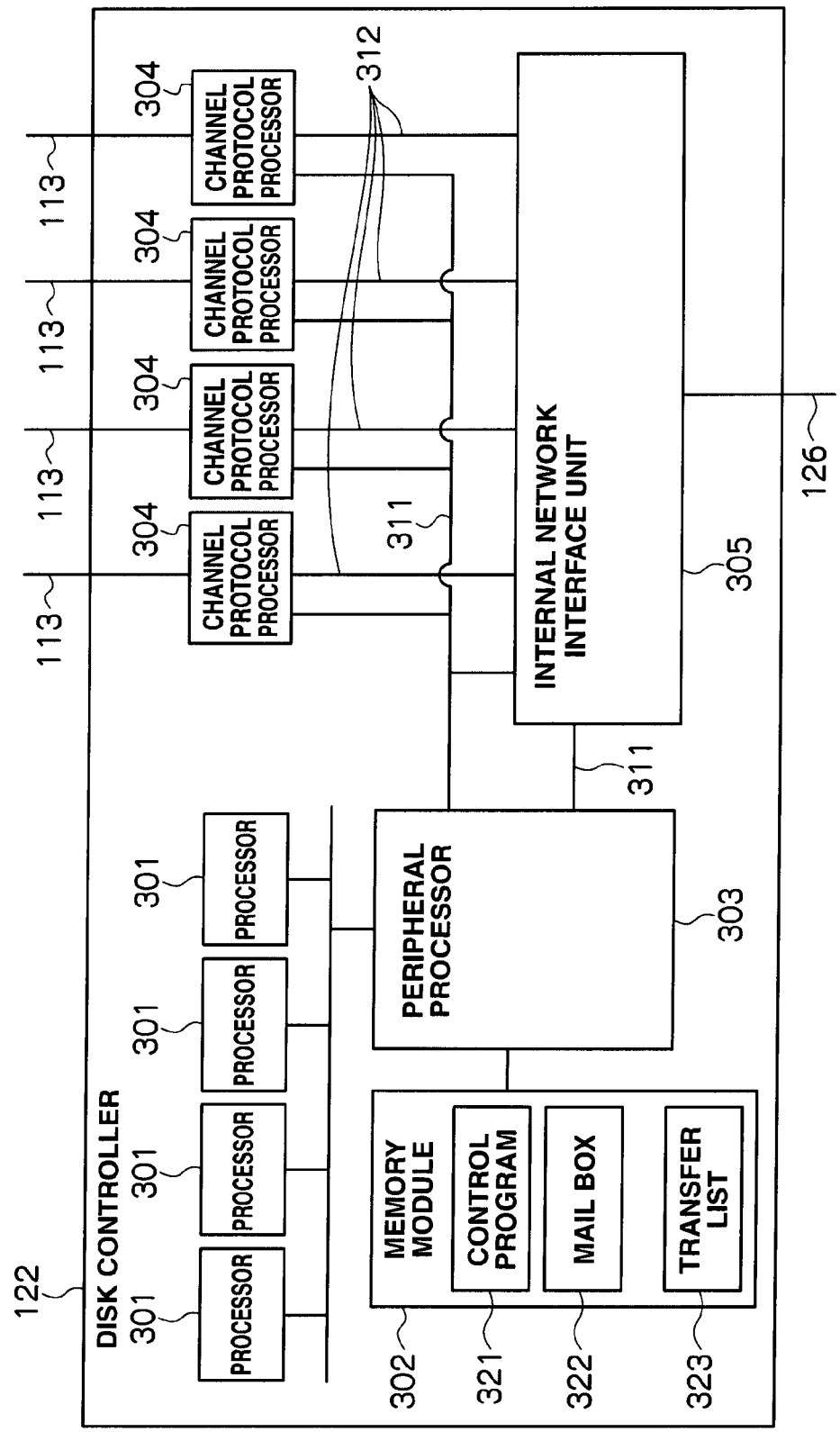
FIG. 3 is a block diagram showing a schematic configuration of a disk controller.

FIG. 3 is a block diagram showing a detailed configuration of the disk controller 124. The disk controller 124 is configured the same as the channel controller 121 other than that the contents of the control program 312 are different, and the channel protocol processing unit 304 communicates with the hard disk drive 103 through the disk-side channel 113. Nevertheless, although the protocols of the channel 111 and the disk-side channel 113 may differ, the [channel protocol processing unit 304] is the same as the channel protocol processing unit 204 of the channel controller 121 from the perspective of performing protocol processing in the disk-side channel 113 and performing conversion to enable processing inside the storage system 100.

The processor 301 writes data stored in the cache memory unit 122 into the hard disk drive 103 based on a request from the channel controller 121 or at predetermined intervals, receives a command from the channel controller 121 when there is no data in the cache memory unit 122, and reads data from the hard disk drive 103 and writes such data into the cache memory unit 122.

Further, the processor 301 accesses the directory information stored in the control information memory unit 123, and searches for the memory address of the cache memory unit 122 to read or store the data requested by the host computer 101. When the requested data does not exist in the cache memory unit 122 or when storing previously-stored data into the hard disk drive 103 in order to create a free area for storing the requested data (this operation is called destaging), the processor 301 controls the hard disk drive 103 through the disk-side channel 113. Thereupon, the processor 301 subjects the hard disk drive 103 group to RAID control so as to improve the availability and performance of the overall hard disk drive 103.

Figure 4:
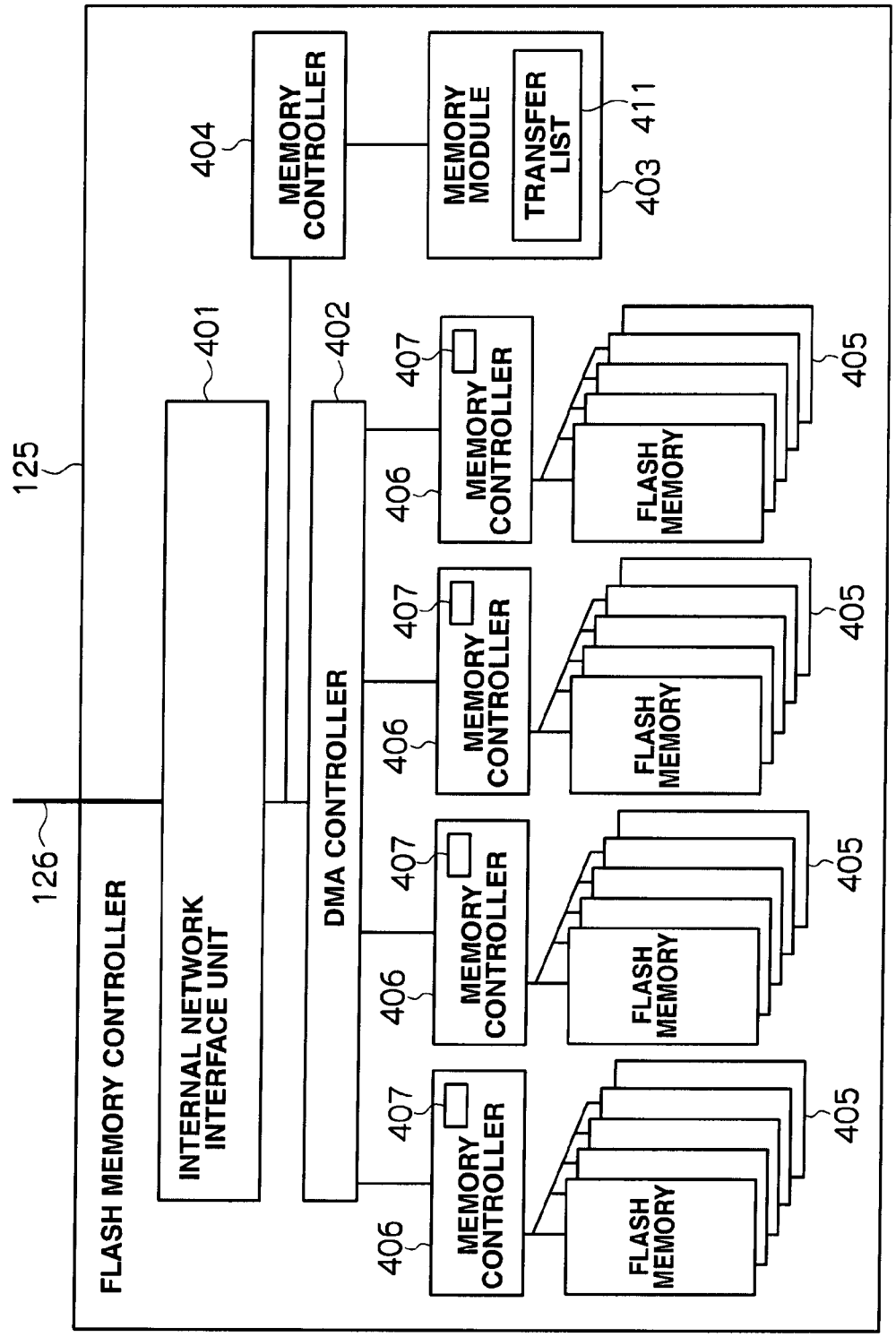
FIG. 4 is a block diagram showing a schematic configuration of a flash memory controller.

FIG. 4 is a block diagram showing a detailed configuration of the flash memory controller 125. The flash memory controller 125 comprises an internal network interface unit 401, a DMA controller 402, a memory module 403 as a volatile memory, a memory controller 404 for controlling the memory module 403, a flash memory 405, and a memory controller 406 for controlling the flash memory 405.

The internal network interface unit 401 is a component to become an interface upon communicating the respective constituent elements inside one's own flash memory controller 125 and inside other storage systems 100 via the internal bus 126.

The DMA controller 402 in the flash memory controller 125, for instance, transfers data from the cache memory unit 122 to the flash memory 405 based on the transfer list 411 set by the processor 201 of the channel controller 121 when creating free space in the cache memory unit 122 upon processing a write request from the host computer 101.

The memory controller 403, for example, controls the flash memory 405 based on a read request from the channel controller 121 or a write request of the DMA controller 402 made through the internal bus 126 to exchange data. The flash memory 405 is directly mounted on a substrate, and, since components such as a connector, protocol processing unit or flash memory-side channel will not be required when providing a flash memory device, it will be possible to realize a more compact flash memory controller 125 and storage system 100. Moreover, the memory controller 406 may also perform wear-leveling adjustment or the like to the respective flash memories 405.

Further, the memory controller 406 collects information regarding the number of deletion errors and number of inferior blocks arising in the access to the flash memory 405 as statistical information 407, stores this in a flash memory provided to a part of or separately from the flash memory 405, and sends the statistical information 407 based on a request from the processor 201 of the channel controller 121.

Figure 5:
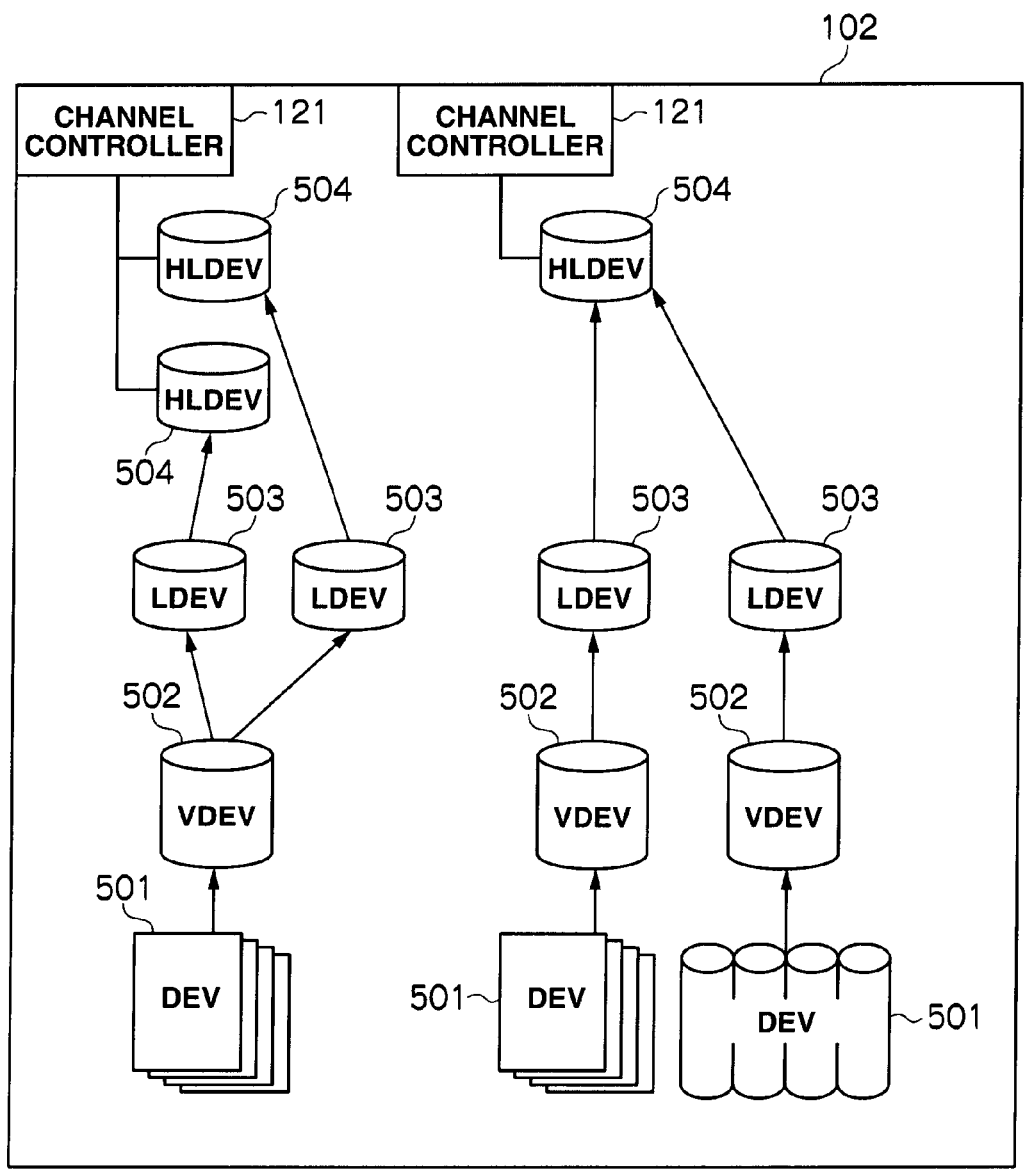
FIG. 5 is a conceptual diagram explaining the storage hierarchy created inside the storage controller.

FIG. 5 is a diagram showing the storage hierarchy created in the storage controller 102. The storage hierarchy created in the storage controller 102 can be classified broadly into a physical storage hierarchy and a logical storage hierarchy. The physical storage hierarchy is configured from a device (hereinafter referred to as a "DEV") 501 configured from one or more hard disk drives 103 or one or more flash memories 405.

The logical storage hierarchy is configured from a plurality of (for instance, three types of) hierarchies. One logical hierarchy is configured from a first logical device (hereinafter referred to as a VDEV (Virtual Device)) 502. Another logical hierarchy is configured from a second logical device (hereinafter referred to as a LDEV (Logical Device)) 503. The remaining logical hierarchy is configured from a third logical device (hereinafter referred to as a HLDEV (Host Logical Device)) 504.

The VDEV 502, for instance, is subject to RAID control with four hard disk drives 103 or four flash memories 405 as a set, and is configured as (3D+1P) by being grouped. In other words, the storage extents provided respectively by the hard disk drives 103 or the flash memories 405 are gathered to form one DEV 501, and the address space of the DEV 501 becomes the VDEV 502.

Incidentally, other RAID configurations can be applied to the VDEV 502. In other words, one hard disk drive 103 or one flash memory 405 can be assigned to a plurality of VDEVs 502 (slicing), or one VDEV 502 can be formed from a plurality of hard disk drives 103 or a plurality of flash memories 405 (striping, mirroring).

One or more LDEVs 503 can be provided in the VDEVs 502, respectively. The LDEV 503, for example, is configured by dividing the VDEV 502 in a fixed length.

The HLDEV 504 is a logical storage unit recognized by the host computer 101. For instance, when the host computer 101 is a UNIX (registered trademark) system, the HLDEV 504 is associated with a device file. When the host computer 101 is a Windows (registered trademark) system, the HLDEV 504 is associated with a drive letter (drive name). Each HLDEV 504 is connected to the host computer 101 via the channel controller 121. At least one or more LDEVs 503 can be mapped to the respective HLDEVs 504. By mapping a plurality of LDEVs 503 to one HLDEV 504, the size of the HLDEV 504 can be virtually expanded.

Figure 6:
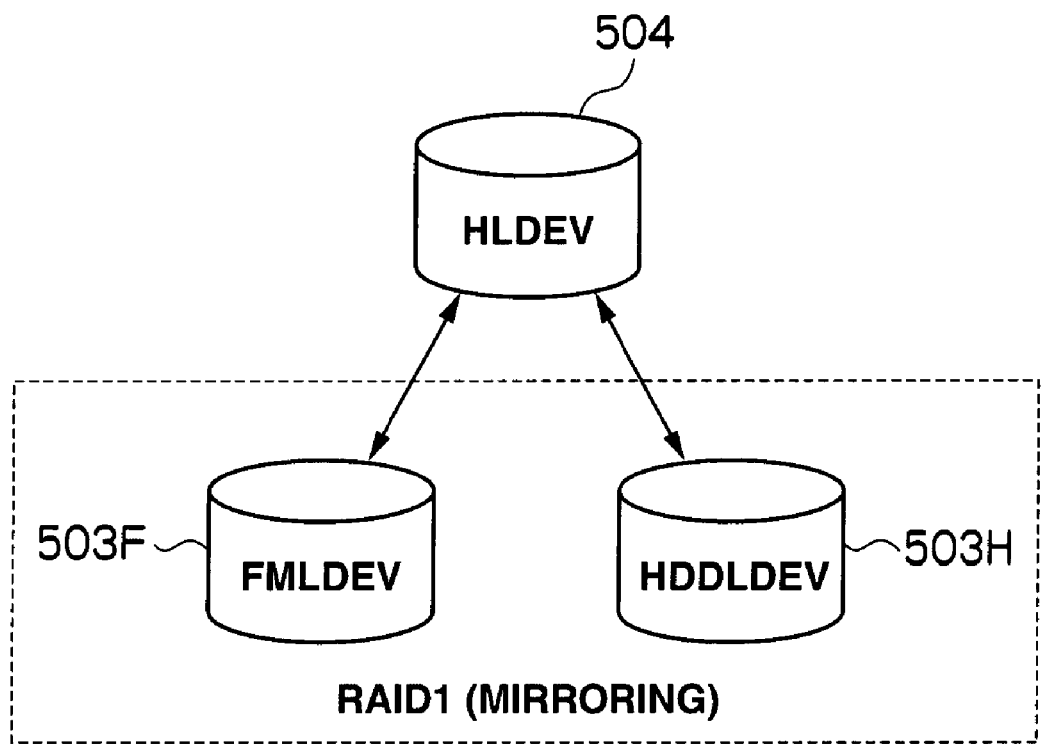
FIG. 6 is a conceptual diagram explaining the correspondence of a HLDEV and a LDEV created inside the storage controller.

FIG. 6 is a diagram showing the correspondence of the HLDEV 504 and the LDEV 503 created in the storage controller 102. In this embodiment, the LDEV 503 configured from the flash memory 405 is allocated to the HLDEV 504 with at least one level of redundancy. In other words, in this embodiment, the HLDEV 504 is configured redundantly including the LDEV 503 configured from the flash memory 405.

For instance, in this embodiment, as shown in FIG. 6, data sent to one HLDEV 504 is made redundant by performing mirroring based on RAID 1 to the LDEV 503 configured from the flash memory 405 and the LDEV 503 configured from the hard disk drive 103. In other words, in this embodiment, the LDEV 503 configured from the flash memory 405 and the LDEV 503 configured from the hard disk drive 103 are pair-configured against one HLDEV 504 in order to store the same data. Here, in this embodiment, in order to perform mirroring, the storage capacity of the DEV 501 (flash memory 405) allocated to the LDEV 503 and the storage capacity of the DEV 501 (hard disk drive 103) allocated to the LDEV 503 are configured to be the same storage capacity.

When it is necessary to identify the LDEV 503, the LDEV 503 configured from the flash memory 405 to be mirrored against the HLDEV 504 is hereinafter referred to as a FMLDEV 503F, and the LDEV 503 configured from the hard disk drive 103 to be mirrored is hereinafter referred to as a HDDLDEV 503H.

Further, in this embodiment, upon receiving an I/O request from the host computer 101, data is read or written by switching the flash memory 405 and the hard disk drive 103 depending on the situation. Here, in this embodiment, in order to seek the prolonged duration of the hard disk drive 103, the hard disk drive 103 is basically left in a stopped state (described later), and changed to a running state (spinup completion state (described later)) in prescribed cases. Moreover, in this embodiment, since there is a limitation in the write cycle of the flash memory 405, when the hard disk drive 103 is in a running state, data write processing is preferentially performed to the hard disk drive 103. Incidentally, the detailed explanation regarding these operations will be explained with reference to the flowcharts described later.

Figure 7:
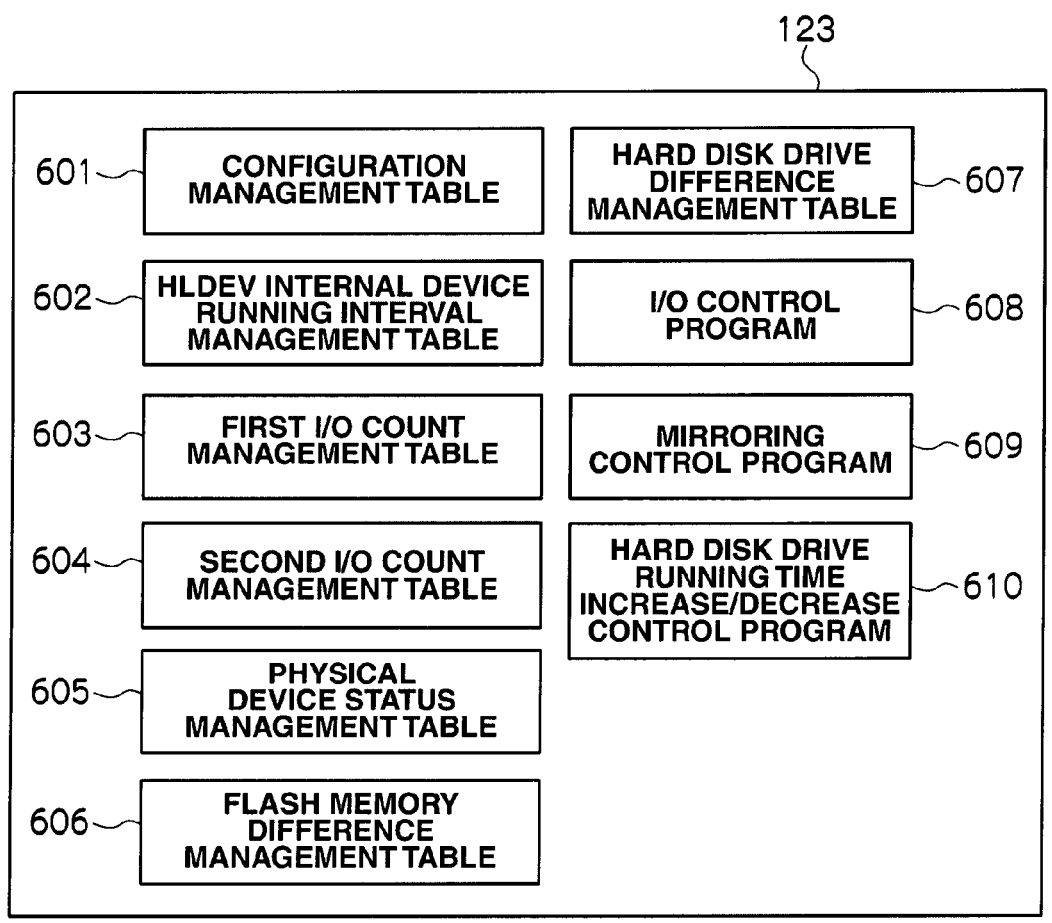
FIG. 7 is a conceptual diagram explaining various tables and various programs stored in a control information memory unit.

FIG. 7 is a diagram showing the various tables and the various programs stored in the control information memory unit 123. The control information memory unit 123 stores a configuration management table 601, a HLDEV internal device running interval management table 602, a first I/O request management table 603, a second I/O request management table 604, a physical device status management table 605, a flash memory difference management table 606, a hard disk drive difference management table 607, an I/O control program 608, a mirroring program 609, and a hard disk drive running time increase/decrease control program 610. Incidentally, each piece of information stored in these various tables is created and updated based on operations by the administrator for defining the system configuration information or requests from the processor 201 of the channel controller 121. Incidentally, the detailed explanation regarding these various tables and various programs will be explained with reference to the drawings and flowcharts described later.

FIG. 8 is a diagram showing a configuration of the configuration management table 601. The configuration management table 601 is configured from a management ID column 701 for storing a management number of the configuration management table 601, a HLDEVID column 702 for storing a HLDEVID as a number for uniquely identifying the HLDEV 504, a LDEVID column 703 for storing a LDEVID as a number for uniquely identifying the LDEV 503, a VDEVID column 704 for storing a VDEVID as a number for uniquely identifying the VDEV 502, a DEVID column 705 for storing a DEVID as a number for uniquely identifying the DEV 501, and a DEV extent column 706 for storing the first and last addresses of an extent as the storage extent of the DEV 501 allocated to the HLDEV 504.

The configuration management table 601 manages, for each management ID, the HLDEVID, the LDEVID of the LDEV 503 associated with the HLDEV 504 of the HLDEVID, the VDEVID of the VDEV 502 associated with the LDEV 503 of the LDEVID, the DEVID of the DEV 501 associated with the VDEV 502 of the VDEVID, and the extent of the DEV 501 of the DEVID.

For example, the HLDEV 504 of HLDEVID "1" will perform mirroring, based on RAID 1, to the FMLDEV 503F of LDEVID "001" configured from the flash memory 405 and the HDDLDEV 503H of LDEVID "003" configured from the hard disk drive 103. Here, the storage capacity of DEVID "1001" and the storage capacity of DEVID "1003" are made to be the same storage capacity as evident from the DEV extent column 706.

FIG. 9 is a diagram showing the configuration of a HLDEV internal device running interval management table 602. The HLDEV internal device running interval management table 602 is configured from a management ID column 711, a HLDEVID column 712, a LDEVID column 713, a VDEVID column 714, a DEVID column 715, an operating time setting column 716, a final ON time column 717, a final OFF time column 718, a priority read processing confirmation column 719, and a running state confirmation column 720.

The operating time setting column 716 stores information representing the operating time per day of the hard disk drive 103. For example, when "4h" is stored in the operating time setting column 716, this represents that the hard disk drive 103 was in a running state for 4 hours, and in a stopped state for 20 hours, and this is repeated.

The final ON time column 717 stores information on the date and time regarding the last time the hard disk drive 103 was in a running state. The final OFF time column 718 stores information on the date and time regarding the last time the hard disk drive 103 was in a stopped state. The final ON time column 717 and the final OFF time column 718 are information required in calculating the time to subsequently enter a running state or the time to subsequently enter a stopped state.

The priority read processing confirmation column 719 stores information for confirming whether to preferentially read data from the flash memory 405 or the hard disk drive 103 upon receiving a read request from the host computer 101. For example, when preferentially reading data from the flash memory 405, "FM priority" is stored in the column corresponding to the flash memory 405 of the priority read processing confirmation column 719, and, when preferentially reading data from the hard disk drive 103, "HDD priority" is stored in the column corresponding to the hard disk drive 103 of the priority read processing confirmation column 719.

The running state confirmation column 720 stores information for confirming whether the hard disk drive 103 is in a running state. For example, when the hard disk drive 103 is in a running state, "ON" is stored in the column corresponding to the hard disk drive 103 of the running state confirmation column 720, and, when the hard disk drive 103 is in a stopped state, "OFF" is stored in the column corresponding to the hard disk drive 103 of the running state confirmation column 720.

The HLDEV internal device running interval management table 602 manages, for each management ID, the HLDEVID, the LDEVID of the LDEV 503 associated with the HLDEV 504 of the HLDEVID, the VDEVID of the VDEV 502 associated with the LDEV 503 of the LDEVID, the DEVID of the DEV 501 associated with the VDEV 502 of the VDEVID, and the operating time, final ON time, final OFF time, information on priority read processing confirmation and information on running state confirmation of the DEV 501 of the DEVID.

Incidentally, since the DEV 501 configured from the flash memory 405 is constantly in a running state without any change between a stopped state and a running state, "-" is stored in the operating time setting column 716, the final ON time column 717, the final OFF time column 718, and the running state confirmation column 720.

Figure 10:
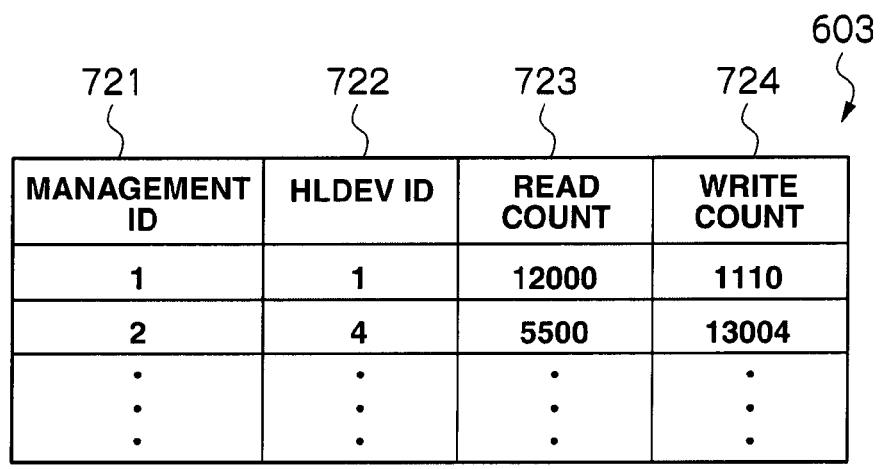
FIG. 10 is a conceptual diagram explaining a first I/O count management table.

FIG. 10 is a diagram showing the configuration of a first I/O request management table 603. The first I/O request management table 603 is configured from a management ID column 721, a HLDEVID column 722, a read count column 723 for storing the read count as the number of times data read processing was performed to the HLDEV 504, and a write count column 724 for storing the write count as the number of times data write processing was performed to the HLDEV 504. The first I/O request management table 603 manages, for each management ID, the HLDEVID, the read count of data stored in the HLDEV 504 of the HLDEVID, and the write count of data stored in the HLDEV 504 of the HLDEVID.

Figure 11:
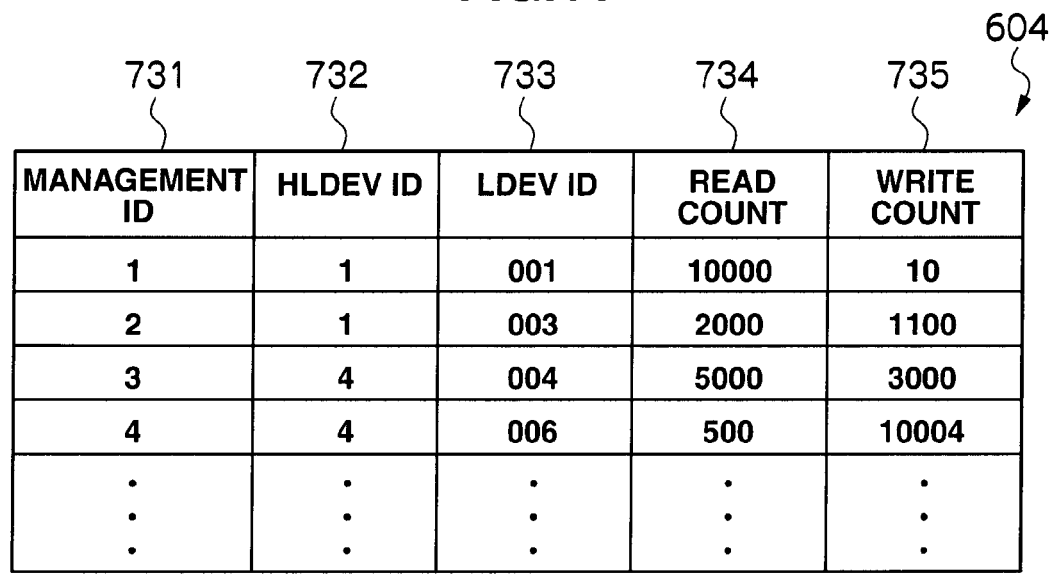
FIG. 11 is a conceptual diagram explaining a second I/O count management table.

FIG. 11 is a diagram showing the configuration of a second I/O request management table 604. The second I/O request management table 604 is configured from a management ID column 731, a HLDEVID column 732, a LDEVID column 733, a read count column 734, and a write count column 735. The second I/O request management table 604 manages, for each management ID, the HLDEVID, the LDEVID of the LDEV 503 associated with the HLDEV 504 of the HLDEVID, the read count of data stored in the LDEV 503 of the LDEVID, and the write count of data stored in the LDEV 503 of the LDEVID.

FIG. 12 is a diagram showing the configuration of a physical device status management table 605. The physical device status management table 605 is configured from a management ID column 741, a DEVID column 742, a physical device column 743, a write count column 744, a deletion count column 745, an inferior block count column 746, an inferior block increasing rate column 747, an average deletion time column 748, an ON/OFF count column 749, and an operating time column 750.

The physical device column 743 stores a physical device ID as a number for uniquely identifying a physical device such as the flash memory 405 or the hard disk drive 103. The write count column 744 stores a total read count as the total number of times data write processing was previously performed to the flash memory 405 of the physical device ID. The deletion count column 745 stores a total deletion count as the total number of times data deletion processing was previously performed to the flash memory 405 of the physical device ID.

The inferior block count column 746 stores an inferior block count as the number of inferior blocks of a storage extent in which data can no longer be written in the flash memory 405 or the hard disk drive 103 of the physical device ID. The inferior block increasing rate column 747 stores an inferior block increasing rate as the increasing rate of inferior blocks calculated based on changes in the inferior block count of the inferior block count column 746 for each predetermined period of time. The average deletion time column 748 stores an average processing time as the average time required for the data deletion processing in the flash memory 405 of the physical device ID. The ON/OFF count column 749 stores an ON/OFF count as the number of times ON (running state) and OFF (stopped state) were switched in the hard disk drive 103 of the physical device ID. The operating time column 750 stores the total operating time as the total time the flash memory 405 or the hard disk drive 103 of the physical device ID has been previously operated.

The physical device status management table 605 manages, for each management ID, the DEVID, the physical device ID of the physical device associated with the DEV 501 of the DEVID, the total read count and the total deletion count of the physical device of the physical device ID, and the inferior block count, inferior block increasing rate, average deletion time, ON/OFF count and total operating time of the physical device of the physical device ID. Incidentally, each piece of information stored in the physical device status management table 605 is created and updated based on the collected information of the hard disk drive 10 collected by the processor 301 of the disk controller 124 and the collected information 407 collected by the memory controller 406 of the flash memory controller 125.

Incidentally, since the physical device of the flash memory 405 is constantly in a running state without any change between a stopped state and a running state, "-" is stored in the ON/OFF count column 749.

Further still, since there is no limitation in the write cycle or deletion cycle regarding the physical device of the hard disk drive 103 or any increase in the average deletion time due to an increase in the deletion count, "-" is stored in the total write count column 744, the total deletion count column 745, and the average deletion time column 748.

Figure 13:
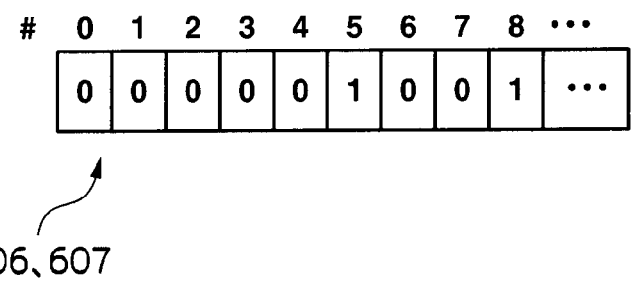
FIG. 13 is a conceptual diagram explaining a flash memory difference management table and a hard disk drive difference management table.

FIG. 13 is a diagram showing the configuration of a flash memory difference management table 606 and a hard disk drive difference management table 607. The flash memory difference management table 606 and the hard disk drive difference management table 607 are managed for each flash memory 405 or hard disk drive 103, and manage whether there is any difference in the data between the flash memory 405 and the hard disk drive 103 for each storage extent of a prescribed unit.

The flash memory difference management table 606 and the hard disk drive difference management table 607 manage the identification bit of a storage extent with a difference between the flash memory 405 and the hard disk drive 103 with "1" which represents "difference exists". This represents a state where latest data is stored in the storage extent of either the flash memory 405 or the hard disk drive 103.

Further, the flash memory difference management table 606 and the hard disk drive difference management table 607 manage the identification bit of a storage extent representing a state other than a difference between the flash memory 405 and the hard disk drive 103 with "0". This represents a state where the same data is stored in the storage extent between the flash memory 405 and the hard disk drive 103, or latest data is stored in the storage extent of the corresponding flash memory 405 or the hard disk drive 103.

Figure 14:
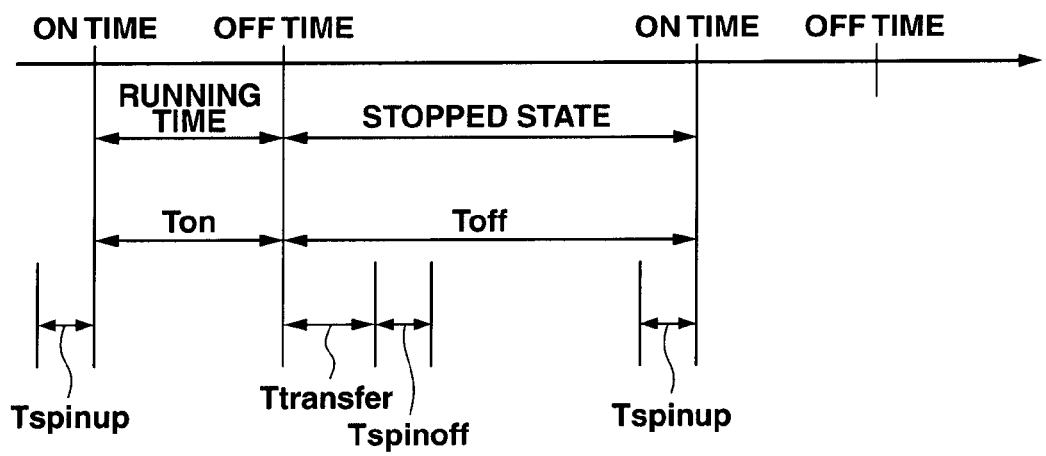
FIG. 14 is a conceptual diagram explaining the switch timing of the running time and stop time in a hard disk drive.

FIG. 14 is a diagram showing the switch timing of the running time and stop time in the hard disk drive 103. In this embodiment, a state of activating the hard disk drive 103, completing the spinup and standing by for writing data is defined as a running state (spinup completion state), and a state that is not a running state is defined as a stopped state. Further, in this embodiment, the time in a running state is defined as running time (Ton), and the time in a stopped state is defined as stop time (Toff).

The timing of switching from the stop time to the running time is now explained. A predetermined period of time is required from the hard disk drive 103 starting a spinup based on a start-up request and then entering a running state (spinup completion state). Here, when this time is defined as spinup time "Tspinup", the processor 201 of the channel controller 121 will command start-up in consideration of the spinup time "Tspinup". Specifically, the channel controller 121 sends the start-up command at the start-up time, which is the time from the ON time to the time before the spinup time "Tspinup".

The timing of switching from the running time to the stop time is now explained. The stop time of the hard disk drive 103 is the end of the running time stored in the running time setting column 716, and starts from the point in time when the read/write processing of data is switched from the hard disk drive 103 to the flash memory 405. Specifically, the processor 201 of the channel controller 121 sends a stop command to the disk controller 124 at the end of the running time "Ton".

Further, when the processor 201 of the channel controller 121 sends a stop command and switches from the running time to the stop time, it transfers the difference data stored in the hard disk drive 103 to the flash memory 405. Here, the time after switching to the stop time up to the point in time the difference data stored in the hard disk drive 103 is transferred to the flash memory 405 and such transfer is completed is defined as transfer time "Ttransfer". Although the transfer time "Ttransfer" will change depending on the difference data stored in the hard disk drive 103, for instance, when the difference data stored in the hard disk drive 103 is "100 GBytes" and the throughput of difference data transfer processing is "20 MBytes", this will be "5000 seconds"; or "approximately 1.4 hours".

Moreover, when the processor 201 of the channel controller 121 completes the transfer of difference data, it completes the spinoff and shuts off the hard disk drive 103. Here, the time after completing the transfer of difference data up to the point in time the hard disk drive 103 is shut off is defined as spinoff time "Tspinoff".

Accordingly, the total operating time stored in the operating time column 750 is the total time of the spinup time "Tspinup", the running time "Ton", the transfer time "Ttransfer" and the spinoff time "Tspinoff".

Figure 15:
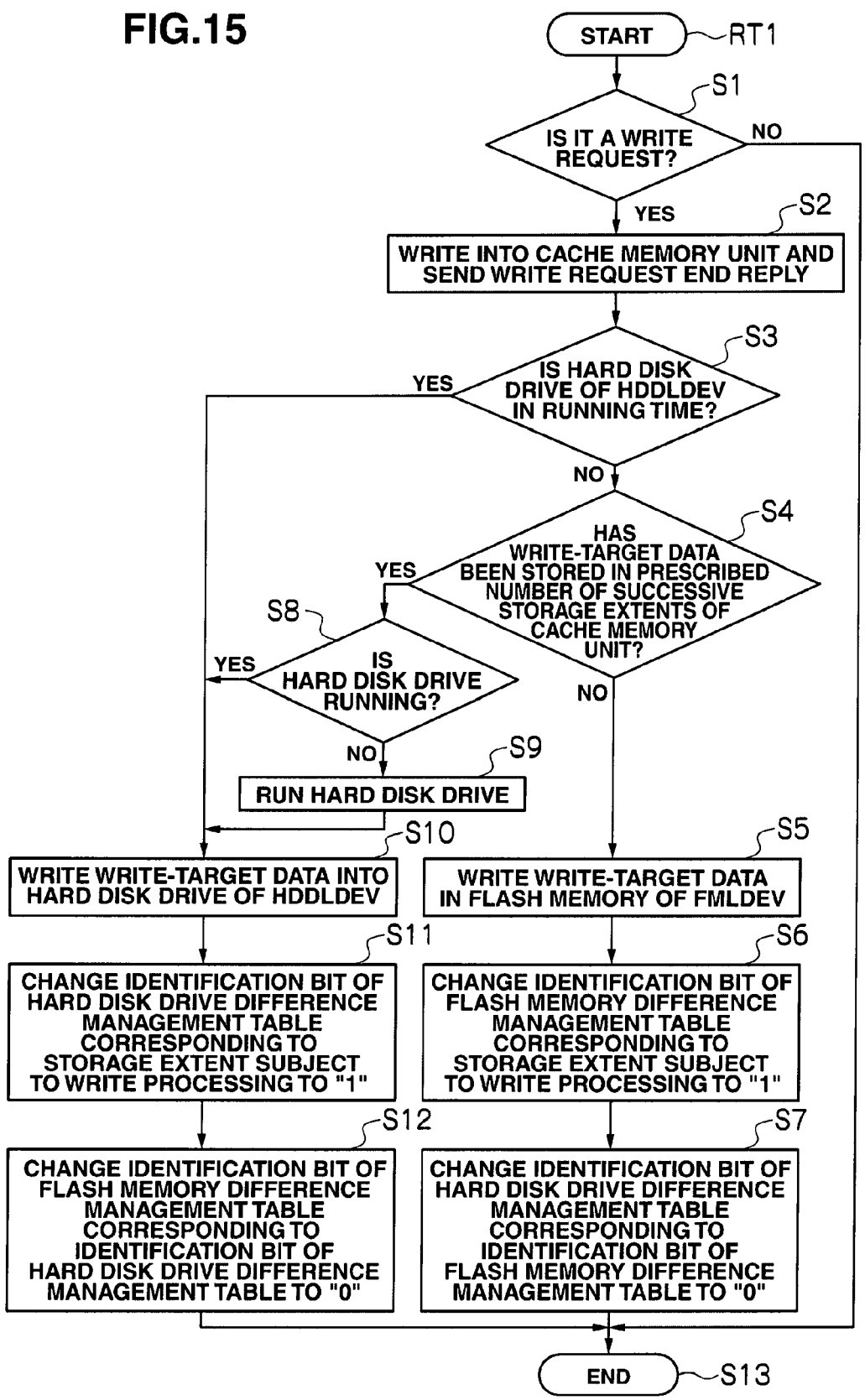
FIG. 15 is a flowchart explaining a write processing routine of I/O control processing.

FIG. 15 is a flowchart showing a specific processing routine of the channel controller 121 of the storage controller 102 relating to the write processing among the I/O control processes in the storage system 100.

When the channel controller 121 (processor 201 of the channel controller 121) receives an I/O request from the host computer 101, by executing the I/O control processing program 608 for controlling the I/O request, it checks whether the received I/O request is a write request according to the write processing routine RT1 of the I/O control processing shown in FIG. 15 (S1). When the received I/O request is not a write request (S1: NO), the channel controller 121 thereafter ends the write processing routine RT1 of the I/O control processing shown in FIG. 15 (S13). Contrarily, when the received I/O request is a write request (S1: YES), the channel controller 121 secures a storage extent in the cache memory unit 122 to which the write-target data, which was received together with the write request, should be written, thereafter writes the write-target data in the storage extent, and sends a write request end reply, which is an end reply to the write request, to the host computer 101 (S2).

Subsequently, the channel controller 121 refers to the running state confirmation column 720 of the HLDEV internal device running interval management table 602, and thereby checks whether the hard disk drive 103 of the HDDLDEV 503H, to which write-target data should be written, is in a running time (S3).

When the hard disk drive 103 of the HDDLDEV 503H is not in a running time (S3: NO), the channel controller 121, for instance, checks whether the write-target data has been stored in a prescribed number of successive storage extents of the cache memory unit 122, such as eight successive storage extents of the cache memory unit 122 (S4).

When the write-target data has not been stored in a prescribed number of successive storage extents of the cache memory unit 122 (S4: NO), the channel controller 121 determines that the write processing is random writing and writes the write-target data into the flash memory 405 of the FMLDEV 503F to which the write-target data should be written (S5). Specifically, the channel controller 121 commands the flash memory controller 125 to write the write-target data into the flash memory 405 of the FMLDEV 503F, and the flash memory controller 125 writes the write-target data into the flash memory 405 of the FMLDEV 503F.

Subsequently, the channel controller 121 changes the identification bit of the flash memory difference management table 606 corresponding to the storage extent of the flash memory 405 that was subject to the write processing of the write-target data to "1" (S6). Then, since the data of the hard disk drive 103 corresponding to the identification bit of the flash memory difference management table 606 is no longer required, the channel controller 121 changes the identification bit of the hard disk drive management table 607 of the hard disk drive 103 to "0" (S7), and thereafter ends this write processing routine RT1 of the I/O control processing shown in FIG. 15 (S13).

Contrarily, when the write-target data has been stored in a prescribed number of successive storage extents of the cache memory unit 122 (S4: YES), the channel controller 121 determines that the write processing is sequential writing. Generally speaking, when the write processing is sequential writing, it is known that the writing speed in writing the write-target data into the hard disk drive 103 is faster than writing the write-target data into the flash memory 405. Thus, when the write-target data has been stored in a prescribed number of successive storage extents of the cache memory unit 122 (S4: YES), the channel controller 121 checks whether the hard disk drive 103 of the HDDLDEV 503H to which the write-target data should be written is running (S8).

When the hard disk drive 103 of the HDDLDEV 503H is not running (S8: NO), the channel controller 121 runs the hard disk drive 103 of the HDDLDEV 503H (S9). Specifically, the channel controller 121 commands the disk controller 124 to run the hard disk drive 103 of the HDDLDEV 503H, and the disk controller 124 runs the hard disk drive 103 of the HDDLDEV 503H.

Thereby, the storage controller 102 is able to improve the writing speed in comparison to cases of writing the write-target data into the flash memory 405, and the access performance can also be improved thereby.

Incidentally, when the channel controller 121 runs the hard disk drive 103 of the HDDLDEV 503H during a time other than the running time of the hard disk drive 103 of the HDDLDEV 503H as described above, it thereafter shuts off the hard disk drive 103 of the HDDLDEV 503H when write processing is not performed to the hard disk drive 103 of the HDDLDEV 503H for a predetermined period of time. Specifically, the channel controller 121 commands the disk controller 124 to shut off the hard disk drive 103 of the HDDLDEV 503H, and the disk controller 124 shuts off the hard disk drive 103 of the HDDLDEV 503H. Then, the channel controller 121 integrates such operating time to the total operating time stored in the operating time column 750.

When the channel controller 121 eventually runs the hard disk drive 103 of the HDDLDEV 503H to which the write-target data should be written (S9), or when the hard disk drive 103 of the HDDLDEV 503H is in a running time (S3: YES), or when the hard disk drive 103 of the HDDLDEV 503H is running (S8: YES), it writes the write-target data in the hard disk drive 103 of the HDDLDEV 503H (S5). Specifically, the channel controller 121 commands the disk controller 124 to write the write-target data into the hard disk drive 103 of the HDDLDEV 503H, and the disk controller 124 writes the write-target data into the hard disk drive 103 of the HDDLDEV 503H.

Subsequently, the channel controller 121 changes the identification bit of the hard disk drive difference management table 607 corresponding to a storage extent of the hard disk drive 103 subject to the write processing of the write-target data to "1" (S11). Then, since the data of the flash memory 405 corresponding to the identification bit of the hard disk drive difference management table 607 is no longer required, the channel controller 121 changes the identification bit of the flash memory management table 606 of the flash memory 405 to "0" (S12), and thereafter ends this write processing routine RT1 of the I/O control processing shown in FIG. 15 (S13).

Figure 16:
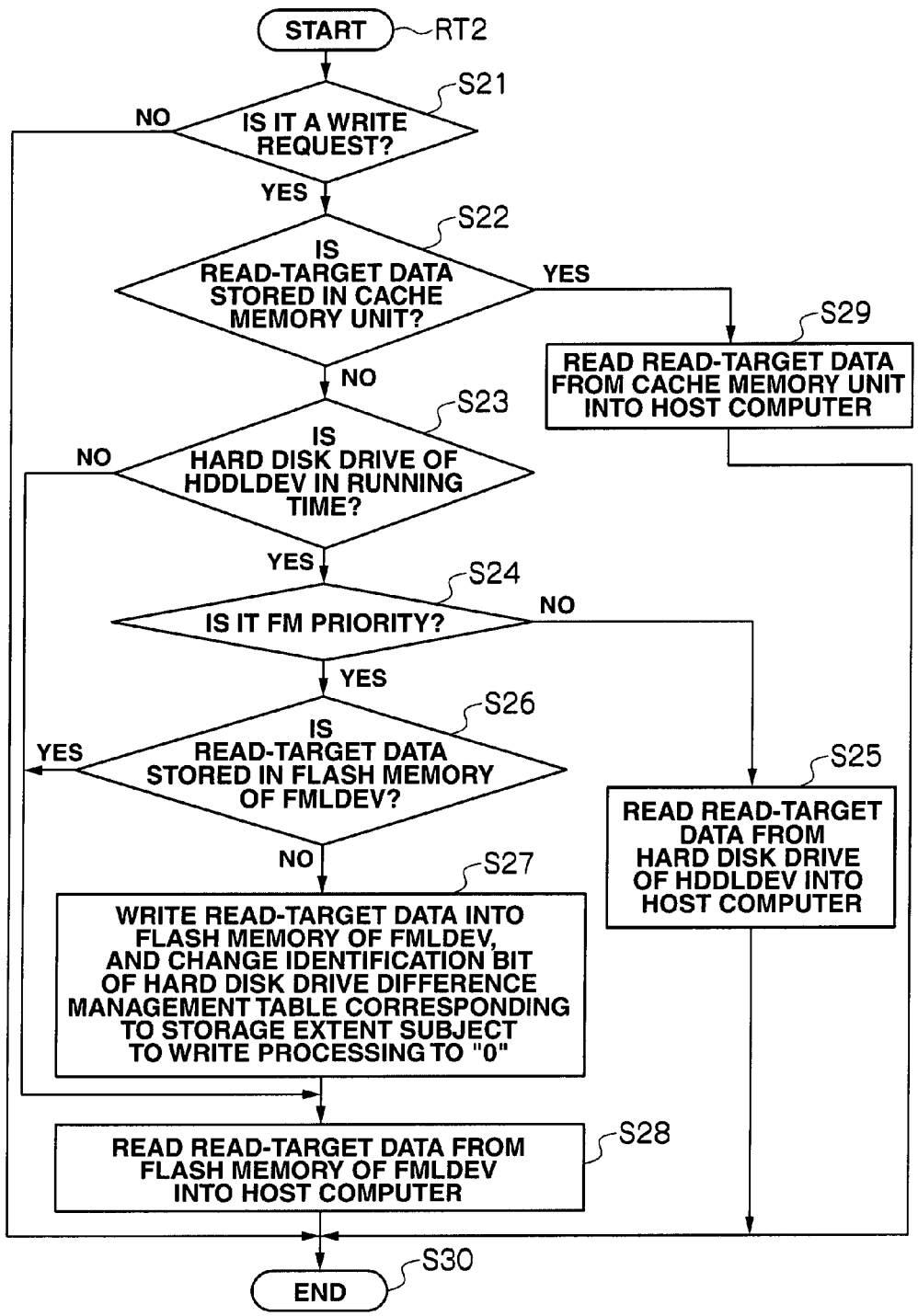
FIG. 16 is a flowchart explaining a read processing routine of I/O control processing.

FIG. 16 is a flowchart showing a specific processing routine of the channel controller 121 of the storage controller 102 relating to the read processing among the I/O control processes in the storage system 100.

When the channel controller 121 receives an I/O request from the host computer 101, by executing the I/O control processing program 608 for controlling the I/O request, it checks whether the received I/O request is a read request according to the read processing routine RT2 of the I/O control processing shown in FIG. 16 (S21). When the received I/O request is not a read request (S21: NO), the channel controller 121 thereafter ends the read processing routine RT2 of the I/O control processing shown in FIG. 16 (S29). Contrarily, when the received I/O request is a read request (S21: YES), the channel controller 121 checks whether the read-target data corresponding to the read request is stored in the cache memory unit 122 (S22).

When the read-target data corresponding to the read request is not stored in the cache memory unit 122 (S22: NO), the channel controller 121 refers to the running state confirmation column 720 of the HLDEV internal device running interval management table 602, and thereby checks whether the hard disk drive 103 of the HDDLDEV 503H from which read-target data should be read is in a running time (S23).

When the hard disk drive 103 of the HDDLDEV 503H in a running time (S23: YES), the channel controller 121 refers to the running state confirmation column 720 of the HLDEV internal device running interval management table 602, and thereby checks whether the FMLDEV 503F to read the read-target data is "FM priority" (S24).

When the FMLDEV 503F is not "FM priority" (S24: NO), the channel controller 121 reads the read-target data from the hard disk drive 103 of the HDDLDEV 503H, from which the read-target data should be read, into the host computer 101 (S25), and thereafter ends this read processing routine RT2 of the I/O control processing shown in FIG. 16 (S30).

Specifically, the channel controller 121 commands the disk controller 124 to read the read-target data from the hard disk drive 103 of the HDDLDEV 503H, from which the read-target data should be read, into the channel controller 121, and the disk controller 124 reads the read-target data from the hard disk drive 103 of the HDDLDEV 503H into the channel controller 121. The channel controller 121 thereafter reads the read-target data into the host computer 101.

Contrarily, when the FMLDEV 503F from which the read-target data should be read is not "FM priority" (S24: NO), the channel controller 121 checks whether the read-target data is stored in the flash memory 405 of the FMLDEV 503F (S26).

When the read-target data is not stored in the flash memory 405 of the FMLDEV 503F (S26: NO), the channel controller 121 determines that the read-target data is stored in the hard disk drive 103 of the HDDLDEV 503H. Generally speaking, it is known that the reading speed in reading the read-target data from the flash memory 405 is faster than reading the read-target data from the hard disk drive 103. Thus, when the read-target data is not stored in the flash memory 405 of the FMLDEV 503F (S26: NO), the channel controller 121 reads the read-target data stored in the hard disk drive 103 of the HDDLDEV 503H from which the read-target data should be read, writes it into the flash memory 405 of the FMLDEV 503F from which the read-target data should be read, and changes the identification bit of the hard disk drive difference management table 607 corresponding to the storage extent of the flash memory 405 to "0" (S27).

Specifically, the channel controller 121 commands the disk controller 124 and the flash memory controller 125 to read the read-target data stored in the hard disk drive 103 of the HDDLDEV 503H from which the read-target data should be read, and write it into the flash memory 405 of the FMLDEV 503F from which the read-target data should be read, and the disk controller 124 reads the read-target data stored in the hard disk drive 103 of the HDDLDEV 503H from which the read-target data should be read, and the flash memory controller 125 writes this into the flash memory 405 of the FMLDEV 503F from which the read-target data should be read.

Thereby, when the storage controller 102 subsequently receives a read request of such read-target data, it is able to improve the reading speed in comparison to cases of reading the read-target data from the hard disk drive 103, and the access performance can also be improved thereby.

When the channel controller 121 eventually reads the read-target data stored in the hard disk drive 103 of the HDDLDEV 503H from which the read-target data should be read, writes it into the flash memory 405 of the FMLDEV 503F from which the read-target data should be read, and changes the identification bit of the hard disk drive difference management table 607 corresponding to a storage extent of the flash memory 405 to "0" (S27), or when the hard disk drive 103 of the HDDLDEV 503H from which the read-target data should be read is not in a running time (S23: NO), it reads the read-target data from the flash memory 405 of the FMLDEV 503F, from which the read-target data should be read, into the host computer 101 (S28), and thereafter ends this read processing routine RT2 of the I/O control processing shown in FIG. 16 (S30).

Specifically, the channel controller 121 commands the flash memory controller 125 to read the read-target data from the flash memory 405 of the FMLDEV 503F into the channel controller 121, and the flash memory controller 125 reads the read-target data from the flash memory 405 of the FMLDEV 503F into the channel controller 121. The channel controller 121 thereafter reads the read-target data into the host computer 101.

Contrarily, when the read-target data corresponding to the read request is stored in the cache memory unit 122, the channel controller 121 reads the read-target data from the cache memory unit 122 into the host computer 101 (S29), and thereafter ends this read processing routine RT2 of the I/O control processing shown in FIG. 16 (S30).

Figure 17:
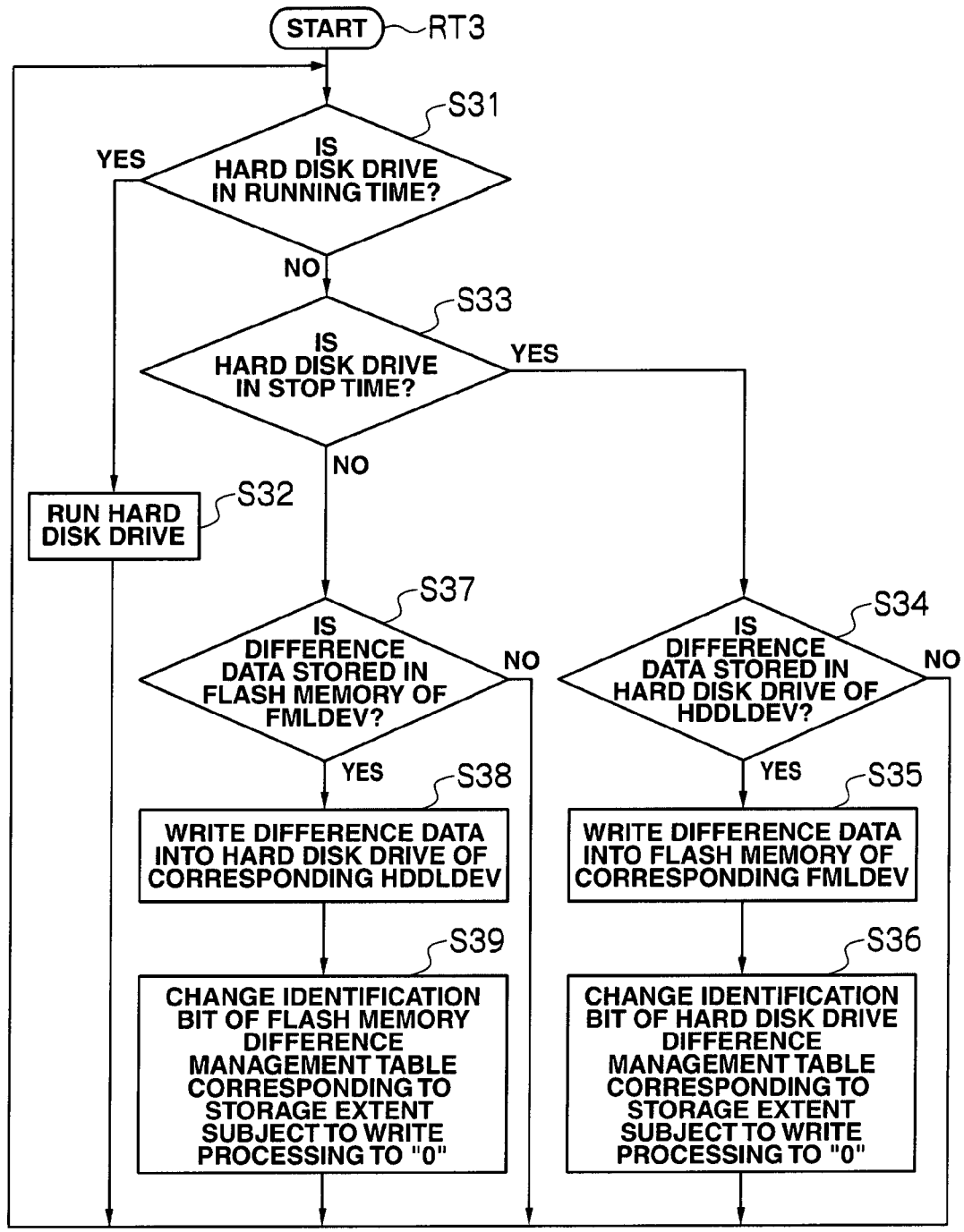
FIG. 17 is a flowchart explaining a mirroring control processing routine.

FIG. 17 is a flowchart showing a specific processing routine of the channel controller 121 of the storage controller 102 relating to the mirroring control processing in the storage system 100.

The channel controller 121, as a result of executing the mirroring control processing program 609 for mirroring the running and shutoff of the hard disk drive 103, checks whether the hard disk drive 103 of the HDDLDEV 503H has reached a start-up time by referring to the HLDEV internal device running interval management table according to the mirroring control processing routine RT3 shown in FIG. 17 (S31).

When the hard disk drive 103 of the HDDLDEV 503H has reached a start-up time (S31: YES), the channel controller 121 runs the hard disk drive 103 of the HDDLDEV 503H (S32), thereafter returns once again to step S31 for checking whether the hard disk drive 103 of the HDDLDEV 503H has reached a start-up time, and then repeats similar processing.

Contrarily, when the hard disk drive 103 of the HDDLDEV 503H has not reached a start-up time (S31: NO), the channel controller 121 checks whether the hard disk drive 103 of the HDDLDEV 503H has reached a stop time by referring to the HLDEV internal device running interval management table (S33).

When the hard disk drive 103 of the HDDLDEV 503H has reached a stop time (S33: YES), the channel controller 121 checks whether difference data is stored in the hard disk drive 103 of the HDDLDEV 503H by referring to the hard disk drive difference management table 607 (S34).

When difference data is not stored in the hard disk drive 103 of the HDDLDEV 503H (S34: NO), the channel controller 121 thereafter once again returns to step S31 for checking whether the hard disk drive 103 of the HDDLDEV 503H has reached a start-up time, and then repeats similar processing.

Contrarily, when difference data is stored in the hard disk drive 103 of the HDDLDEV 503H (S34: YES), the channel controller 121 reads the difference data stored in the hard disk drive 103 of the HDDLDEV 503H, and writes it into the flash memory 405 of the corresponding FMLDEV 503F (S35).

Subsequently, the channel controller 121 changes the identification bit of the hard disk drive difference management table 607 corresponding to a storage extent of the flash memory 405 subject to the write processing of difference data to "0" (S36), thereafter once again returns to step S31 for checking whether the hard disk drive 103 of the HDDLDEV 503H has reached a start-up time, and then repeats similar processing.

Contrarily, when the hard disk drive 103 of the HDDLDEV 503H has not reached a stop time (S33: NO), the channel controller 121 determines that the hard disk drive 103 of the HDDLDEV 503H is in a running time, and checks whether difference data is stored in the flash memory 405 of the corresponding FMLDEV 503F by referring to the flash memory difference management table 606 of the corresponding FMLDEV 503F (S37).

When difference data is not stored in the flash memory 405 of the corresponding FMLDEV 503F (S37: NO), the channel controller 121 thereafter once again returns to step S31 for checking whether the hard disk drive 103 of the HDDLDEV 503H has reached a start-up time, and then repeats similar processing.

Contrarily, when difference data is stored in the flash memory 405 of the corresponding FMLDEV 503F (S37: YES), the channel controller 121 reads the difference data stored in the hard disk drive 103 of the corresponding FMLDEV 503F, and writes it into the hard disk drive 103 of the HDDLDEV 503H (S38).

Specifically, the channel controller 121 commands the disk controller 124 and the flash memory controller 125 to read the difference data stored in the hard disk drive 103 of the corresponding FMLDEV 503F, and write it into the hard disk drive 103 of the HDDLDEV 503H, and the flash memory controller 125 reads the difference data stored in the hard disk drive 103 of the corresponding FMLDEV 503F, and the disk controller 124 writes it into the hard disk drive 103 of the HDDLDEV 503H.

Subsequently, the channel controller 121 changes the identification bit of the flash memory difference management table 606 corresponding to a storage extent of the hard disk drive 103 subject to the write processing of difference data to "0" (S39), and thereafter once again returns to step S31 for checking whether the hard disk drive 103 of the HDDLDEV 503H has reached a start-up time, and then repeats similar processing.

Figure 18:
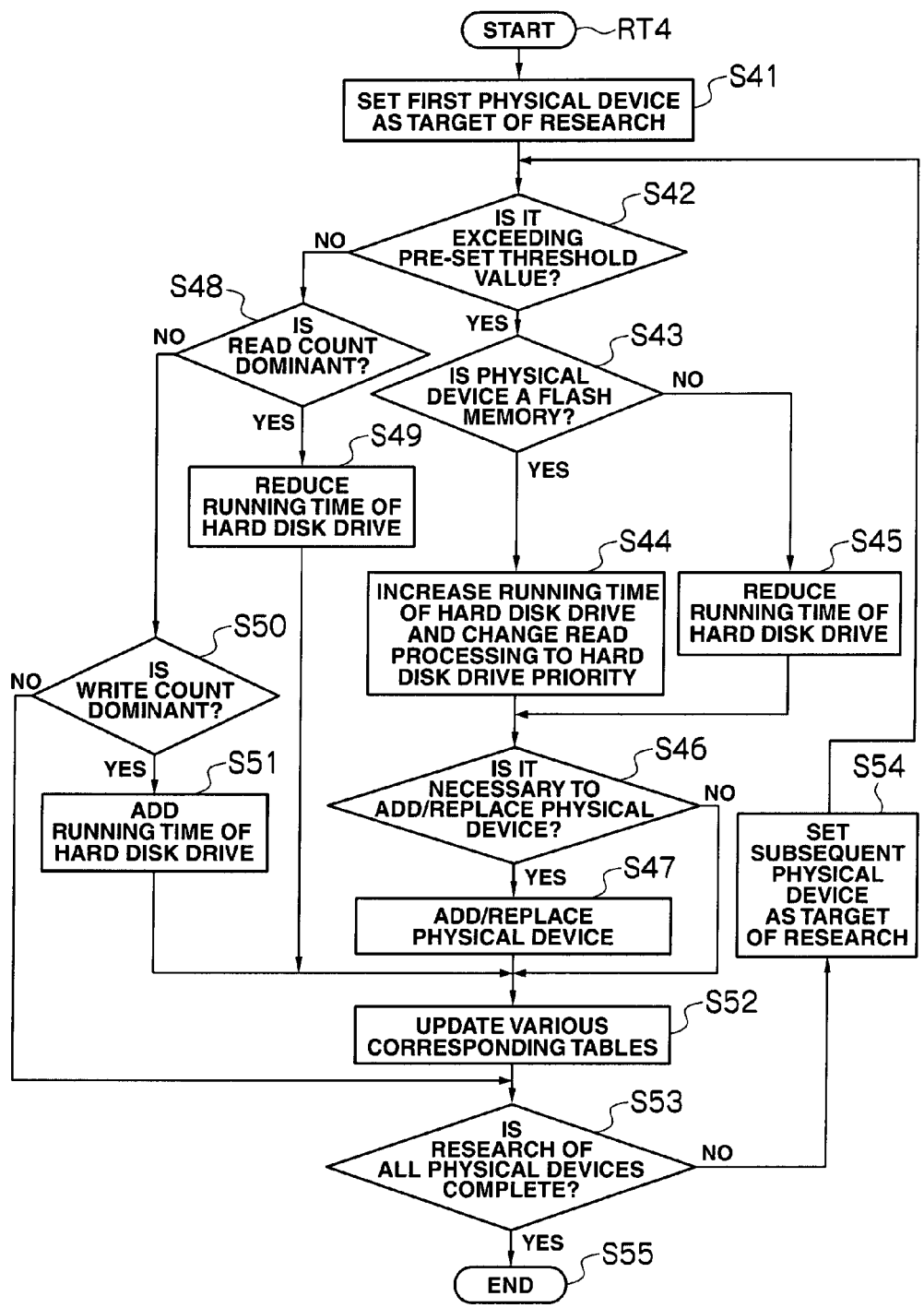
FIG. 18 is a flowchart explaining a hard disk drive running time increase/decrease control processing routine.

FIG. 18 is a flowchart showing a specific processing routine of the channel controller 121 of the storage controller 102 relating to the hard disk drive running time increase/decrease control processing in the storage system 100.

The channel controller 121, as a result of executing the hard disk drive running time increase/decrease control processing program 610 for increasing or decreasing the running time of the hard disk drive 103 for each prescribed timing, sets the first physical device to be researched by referring to the physical device status management table 605 according to the hard disk drive running time increase/decrease control processing routine RT4 shown in FIG. 18 (S41).

Subsequently, the channel controller 121 refers to the physical device status management table 605, and thereby checks whether the set physical device is exceeding a pre-set threshold value (S42). Here, a threshold value is pre-set to the total read count, total deletion count, inferior block count, inferior block increasing rate, average deletion time, ON/OFF count and total operating time of the physical device for the failure management and longer-duration management of the physical device.

When the set physical device is exceeding a pre-set threshold value (S42: YES), the channel controller 121 checks whether the physical device is a flash memory 405 (S43).

When the physical device is a flash memory 405 (S43: YES), the channel controller 121 increases the running time of the LDEV 503 (HDDLDEV 503H) corresponding to the flash memory 405, and gives preference to the read processing of the LDEV 503 (HDDLDEV 503H) corresponding to the flash memory 405.

For instance, when the total read count of the flash memory 405 exceeds 6.5 billion times, when the total deletion count exceeds 500,000 times, when the inferior block count exceeds 320 blocks, when the inferior block increasing rate exceeds 5%, when the average deletion time exceeds 3 ms, or when the total operating time exceeds 75,000 hours, the channel controller 121 increases the running time of the LDEV 503 (HDDLDEV 503H) corresponding to the flash memory 405 by 2 hours, and gives preference to the read processing of the LDEV 503 (HDDLDEV 503H) corresponding to the flash memory 405.

When the physical device is not a flash memory 405 (S43: NO), the channel controller 121 determines that the physical device is a hard disk device 103, and reduces the running time of the LDEV 503 (HDDLDEV 503H) corresponding to the hard disk device 103 (S44).

For instance, when the inferior block count of the hard disk device 103 exceeds 16 blocks, when the inferior block increasing rate exceeds 5%, when the ON/OFF count exceeds 250,000 times, or when the total operating time exceeds 200,000 hours, the channel controller 121 reduces the running time of the LDEV 503 (HDDLDEV 503H) corresponding to the hard disk device 103 by 2 hours.

The channel controller 121 eventually checks whether it is necessary to add or replace the physical device (S46). When it is necessary to add or replace the physical device (S46: YES), the channel controller 121 adds or replaces the physical device (S47). For example, the channel controller 121 sets 80% of the duration of the physical device as a second threshold value, and replaces the physical device when it exceeds such value or when an access failure actually occurs. Incidentally, when it is not a malfunction caused by an access failure, the channel controller 121 adds a physical device from the perspective of lowering the wear level. For example, by performing striping with six hard disk devices 103, in which two among the four that were performing striping were parity, and making one hard disk device 103 a parity, the usage per device will decrease.

Contrarily, when the set physical device is not exceeding the pre-set threshold value (S42: NO), the channel controller 121 refers to the first and second I/O count management tables 603, 604, and thereby checks whether the read count of the HLDEV 504 or the LDEV 503 corresponding to the physical device is priority (S48). When the read count is priority (S48: YES), the channel controller 121 reduces the running time of the LDEV 503 (HDDLDEV 503H) corresponding to the physical device (S49).

For example, the channel controller 121 determines read priority when the quotient upon dividing the read count of the HLDEV 504 or the LDEV 503 corresponding to the physical device with the write count is "1000 or greater", and reduces the running time of the LDEV 503 (HDDLDEV 503H) corresponding to the physical device by 2 hours.

Contrarily, when the read count of the HLDEV 504 or the LDEV 503 corresponding to the physical device is not priority (S48: NO), the channel controller 121 refers to the first and second I/O count management tables 603, 604, and thereby checks whether the write count of the HLDEV 504 or the LDEV 503 corresponding to the physical device is priority (S50). When the write count of the HLDEV 504 or the LDEV 503 corresponding to the physical device is priority (S50: YES), the channel controller 121 increases the running time of the LDEV 503 (HDDLDEV 503H) corresponding to the physical device (S51).

For example, the channel controller 121 determines write priority when the quotient upon dividing the write count of the HLDEV 504 or the LDEV 503 corresponding to the physical device with the read count is "1000 or greater", and increases the running time of the LDEV 503 (HDDLDEV 503H) corresponding to the physical device by 2 hours.

Eventually, when the running time of the LDEV 503 (HDDLDEV 503H) corresponding to the physical device that is not write priority is increased (S51), or when the running time of the LDEV 503 (HDDLDEV 503H) corresponding to the physical device that is not read priority is decreased (S49), or when the physical device is added or replaced (S47), or when it is not necessary to add or replace the physical device (S46: NO), the channel controller 121 updates the various corresponding tables (S52).

For example, when the physical device exceeding the pre-set threshold value is the flash memory 405, the channel controller 121 increases the running time stored in the running time setting column 716 of the HLDEV internal running time interval management table 602 in the LDEV 503 (HDDLDEV 503H) corresponding to the flash memory 405, changes "FM priority" stored in the priority read processing confirmation column 719 of the flash memory 405, and stores "HDD priority" in the priority read processing confirmation column 719 of the LDEV 503 (HDDLDEV 503H) corresponding to the flash memory 405.

Further, for instance, when it becomes necessary to add or replace the physical device exceeding the pre-set threshold value, the channel controller 121 reconfigures the configuration management table 601, the HLDEV internal device running interval management table 602, and the first and second I/O management tables 603, 604.

When the channel controller 121 eventually updates the various corresponding various tables (S52), or when priority is given to the write count of the HLDEV 504 or the LDEV 503 corresponding to the physical device that is not read priority (S50: YES), it checks whether the research of all physical devices is complete (S53). When the research of all physical devices is not complete (S53: NO), the channel controller 121 refers to the physical device status management table 605, and thereby sets the subsequent physical device as the target of research (S54). The channel controller 121 thereafter once again returns to step S42 for checking whether the set physical device is exceeding a pre-set threshold value by referring to the physical device status management table 605, and then repeats similar processing.

Contrarily, when the research of all physical devices is complete (S53: YES), the channel controller 121 thereafter ends the hard disk drive running time increase/decrease control processing routine RT4 shown in FIG. 18 (S55).

An example of a method for calculating the increase or decrease in the running time of the hard disk drive 103 is now explained. As a factor related to the duration of the hard disk drive 103, the maximum total running time is represented as "Tmax", the maximum ON/OFF count is represented as "Non/offmax", and "Tmax70%" represents 70% of the time of "Tmax", and, similarly, "Non/off70%" is made to be the threshold value for increasing or decreasing the running time. In the case of the flash memory 405 also, for instance, the maximum total read count is represented as "Nwrmax", and the threshold value is similarly made to be "Nwrmax70%". Moreover, the current running time setting is made to be "Ton0" hours.

For example, by referring to the first I/O count management table 603, the channel controller 121 determines read priority when the quotient obtained by dividing the read count of the HLDEV 504 or the LDEV 503 corresponding to a prescribed physical device with the write count becomes "1100", and reduces the running time of the LDEV 503 (HDDLDEV 503H) corresponding to the physical device.

Here, as an example of a parameter requiring attention, there is "Nwrmax" as the maximum total read count of the flash memory 405. The amount of time change can be calculated as follows so that this maximum value is not breached.

The time when it became OFF time immediately before the current time is represented as "T1", and the total read count at such time is represented as "NwrT1". Further, when the total read count in the current time "T2" is represented as "NwrT2", the remaining guaranteed duration of the flash memory 405 is represented as "Tlifetimerest", and the current total read count of the current FMLDEV 503F is represented as "NFMLDEVwrT2", wherein $$Nwrmax \geq \frac{NFMLDEVwrT2 + (NwrT2 - NwrT1)}{(T2 - T1)(24 - Ton0)} \quad \text{[Formula 1]}$$
$$(24 - Tonnew)\left(\frac{Tlifetimerest}{24}\right)$$

Further, when the maximum value is represented as "Tb", this results in $$Tb = 24 - \frac{(Nwrmax - NFMLDEVwrT2)}{\dfrac{(NwrT2 - NwrT1)}{(T2 - T1)(24 - Ton0)\left(\dfrac{Tlifetimerest}{24}\right)}} \quad \text{[Formula 2]}$$

and is changed to "Tonnew" within the range of $$Ton0 > Tonnew > Tb \quad \text{[Formula 3]}$$

Although the maximum value "Tb" may fall below "1", in such a case, it is left as "1".

Meanwhile, as an example of a parameter requiring attention when increasing the running time, there is the maximum operating time of the hard disk drive 103. For example, when changing "Ton0" to "Tonnew", in order to make such change so that it will not exceed a predetermined threshold value, when the total operating time up to the current time "T2" is represented as "TontotalT2", the average time required to sync with the difference volume before the switch is represented as "Ttransfer", and the spinoff time as the time from ending the transfer of the difference data and stopping the hard disk drive 103 is represented as "Tspinoff", this is changed to a new "Ton" where $$Tmax70\% \geq TontotalT2 + \quad \text{[Formula 4]}$$
$$(Tonnew + Ttransfer + Tspinoff)\left(\frac{Tlifetimerest}{24}\right)$$

$$Tonnew \leq \frac{Tmax70\% - TontotalT2N}{\dfrac{Tlifetimerest}{24} - (Ttransfer - Tspinoff)} \quad \text{[Formula 5]}$$

Like this, with the storage system 100, a nonvolatile memory having a clear difference in comparison to the hard disk drive 103 regarding the access performance of the flash memory 405 or the like is prepared. In addition, with this storage system 100, the physical device status management table 605 is used to monitor the nonvolatile memory while giving consideration to the fact that such nonvolatile memory has restrictions and duration in its write cycle. Further, as a result of mirroring the storage extent configured from a disk-shaped memory device such as the hard disk drive 103 and the storage extent configured from a nonvolatile memory such as the flash memory 405, it is possible to reduce power consumption, prolong the duration of the nonvolatile memory and disk-shaped memory device, and optimize the access performance by utilizing the storage extent of the nonvolatile memory while maintaining the high access performance of the storage system.

Specifically, with the storage system 100, the storage extent of the hard disk drive 103 is shut down at a certain timing for a predetermined period of time or depending on the monitoring status, and, during that time, I/O requests are received with the storage extent of the flash memory 405 as the redundant pair. Thereupon, with the storage system 100, the difference caused by an update is separately managed, and the synchronization of such difference is performed during the running time of the subsequent hard disk drive 103.

Here, with the storage system 100, the access pattern to the data, rewriting activity of the flash memory 405, and start/stop count of the hard disk drive 103 are the primary items to be monitored, and, for instance, access performance and low power consumption are balanced by making the stop time of the hard disk drive 103 longer when data is frequently read but not rewritten as much.

Further, with the storage system 100, it is also possible to reduce disadvantages of the write performance and rewriting duration as a result of utilizing the conventional advantage of the storage system 100 using the cache memory unit 122.

Further, with the storage system 100, during the reading of data, it is possible to improve the access performance by using, in addition to the conventional cache memory unit 122, the flash memory 405 as though it is a read cache extent.

Accordingly, the storage system 100 realizes low power consumption, prevents deterioration of access performance in necessary data, enables large-scale configuration, and enables storage of data in an optimal media such as the hard disk drive 103 or the flash memory 405. Moreover, with the storage system 100, it is possible to improve the access performance, reliability and availability of the overall system in consideration of the characteristics (rewriting duration, write performance, fault tolerance, etc.) of the respective media.

Incidentally, although the present embodiment described a case of configuring the flash memory 405 and the memory controller 406 with the flash memory controller 125, the present invention is not limited thereto, and various other configurations can be applied to the present invention.

Figure 19:
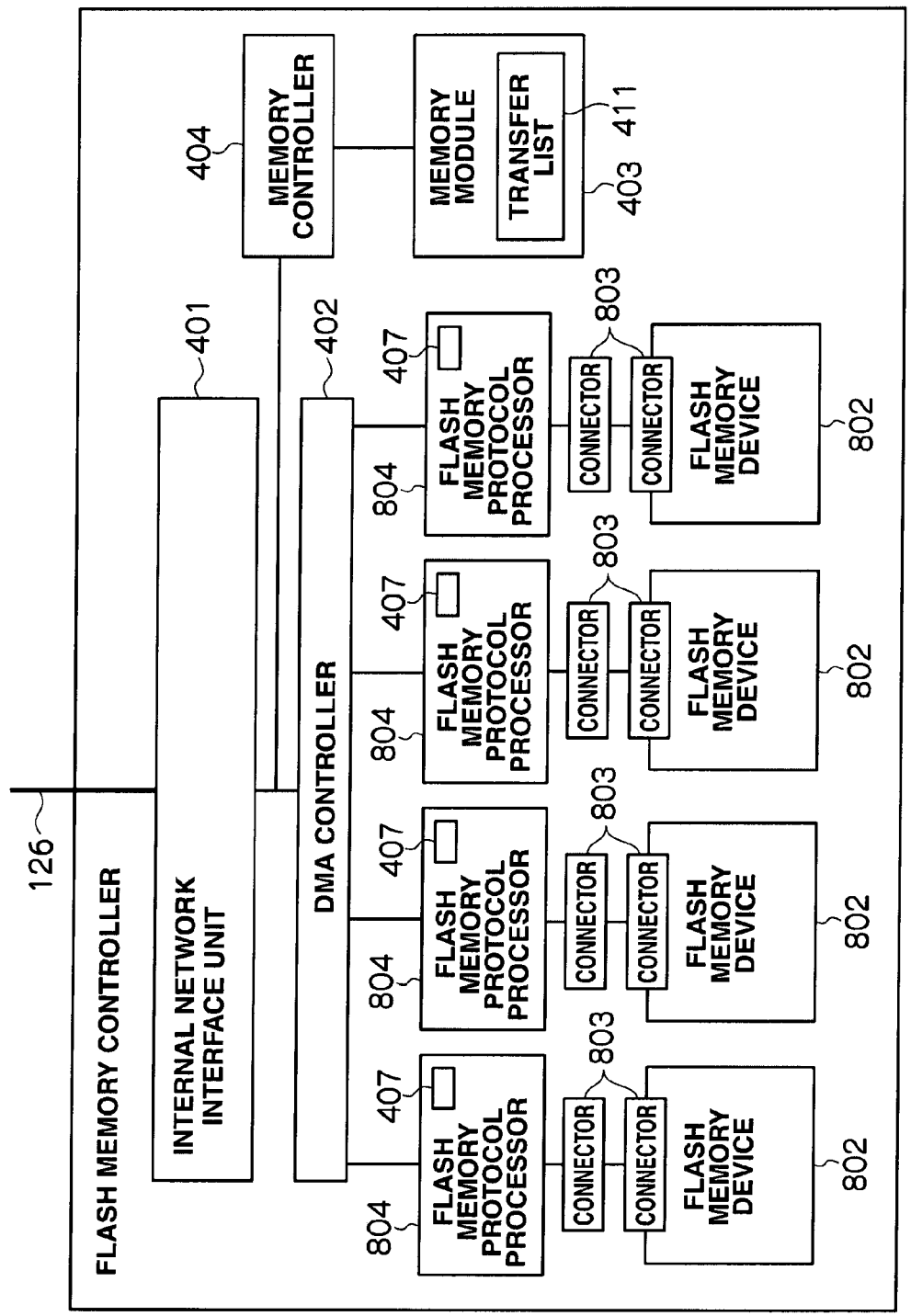
FIG. 19 is a block diagram showing a schematic configuration of a flash memory controller according to another embodiment of the present invention.

FIG. 19 is a block diagram of a flash memory controller 801, which is another detailed configuration of the flash memory controller 125. The flash memory controller 801 is configured the same as the flash memory controller 125 excluding the point that, in substitute for the flash memory 405 and the memory controller 406, it is provided with a flash memory device 802 (this example shows a case of a flash memory device 802 being provided to the flash memory controller 801 internally), a connector 803, and a flash memory protocol processing unit 804 for controlling the flash memory device 802.

The flash memory controller 801 uses the flash memory device 802 as the storage element. The flash memory device 802 is detachable since it is connected to the flash memory protocol controller 804 via the connector 803. Thus, the flash memory controller 801 can be replaced if the flash memory device 802 malfunctions (in order to realize this, the transfer list 411 needs to be set in advance so that the processor 201 of the channel controller 121 becomes a redundant configuration among the flash memory devices 802).

Further, the flash memory controller 801 is able to replace the flash memory device 802 with another one having a greater capacity. Moreover, the flash memory controller 801 performs the exchange of data with the flash memory device 802 using a general-purpose protocol (a low level access protocol such as ONFI (Open NAND Flash Interface) or Compact Flash (registered trademark)). Thus, the flash memory controller 801 performs conversion in the flash memory protocol processing unit 804 so as to enable processing within the storage controller 102.

Figure 20:
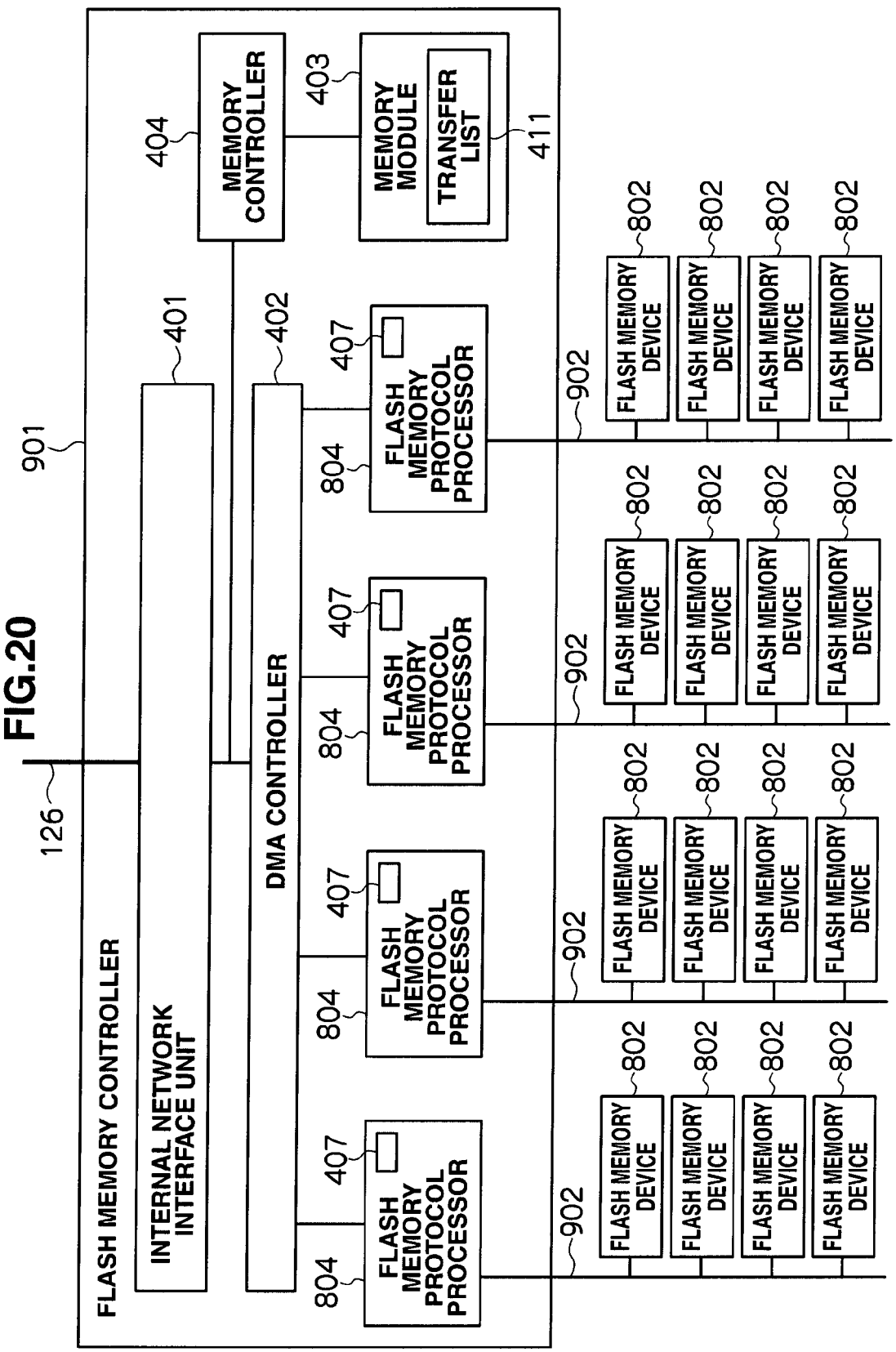
FIG. 20 is a block diagram showing a schematic configuration of a flash memory controller according to another embodiment of the present invention.

FIG. 20 is a block diagram of a flash memory controller 810, which is another detailed configuration of the flash memory controller 801. The flash memory controller 810 connects the flash memory device 802 to the flash memory-side channel 902. Thereby, in addition to the features of FIG. 19, the flash memory controller 810 is able to connect even more flash memory devices 802 in order to realize a large-capacity storage system.

Incidentally, although this embodiment explained a case of setting the storage capacity of the DEV 501 (flash memory 405) allocated to the LDEV 503 and the storage capacity of the DEV 501 (hard disk drive 103) allocated to the LDEV 503 to be the same storage capacity, the present invention is not limited thereto, and the storage capacity of the DEV 501 (hard disk drive 103) allocated to the LDEV 503 does not have to be the same storage capacity.

Figure 21:
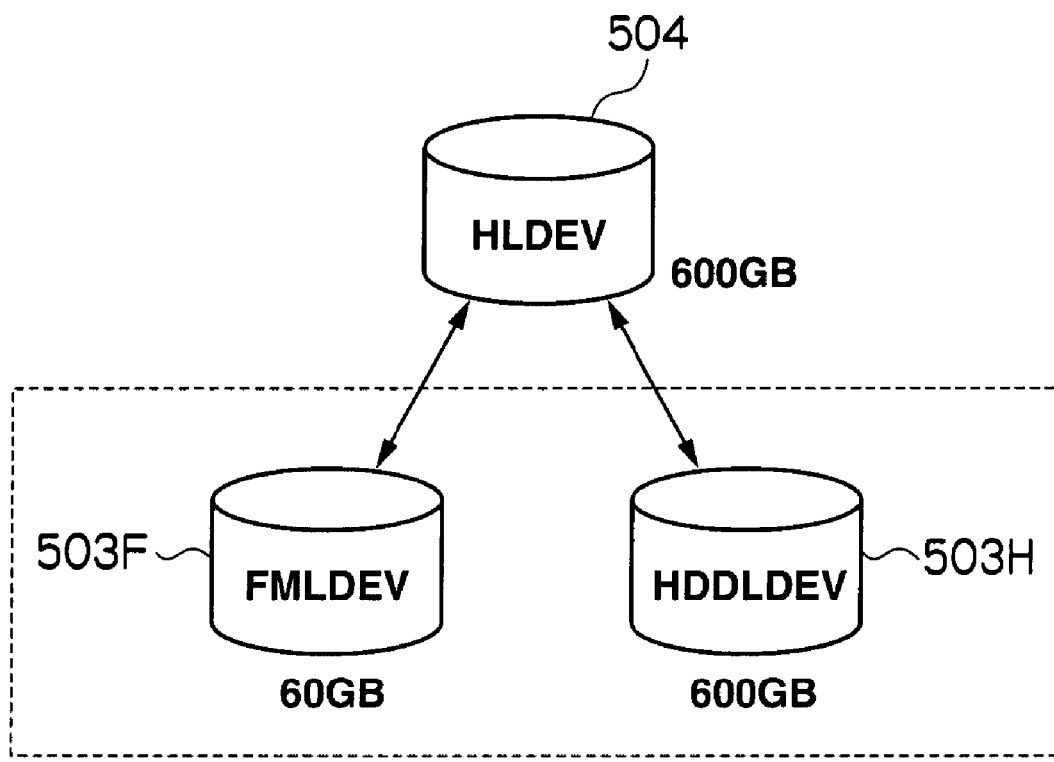
FIG. 21 is a conceptual diagram explaining the correspondence of a HLDEV and a LDEV created inside the storage controller according to another embodiment of the present invention.

For example, as shown in FIG. 21, even in a case of pair-configuring the FMLDEV 503F and the HDDLDEV 503H upon setting the HLDEV 504 to be 600 GBytes, the FMLDEV 503F to be 60 GBytes, and the HDDLDEV 503H to be 600 GBytes, when there is locality in the data access, by storing data with locality in the flash memory 405 of the FMLDEV 503F, the same effect as this embodiment can be obtained.

Figure 22:
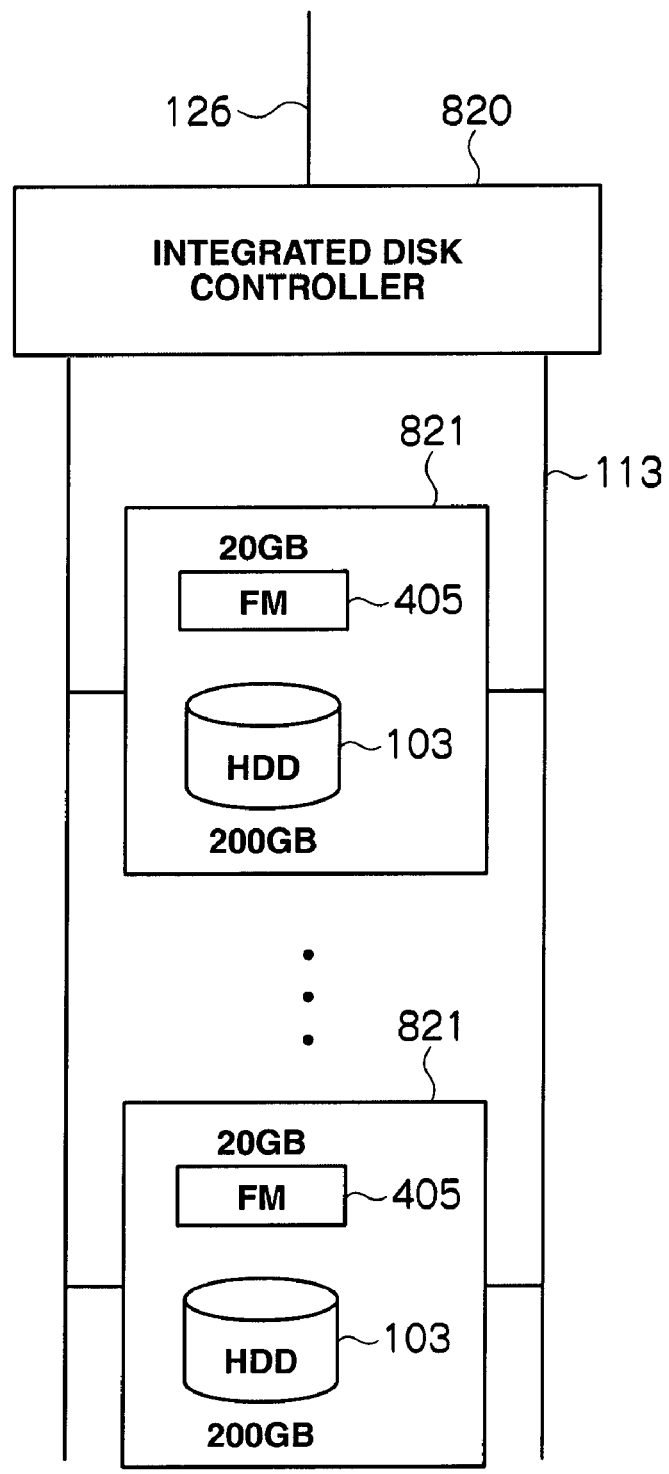
FIG. 22 is a block diagram showing a schematic configuration of an integrated disk controller and an integrated hard disk drive.

Further, for instance, as shown in FIG. 22, the integrated disk controller 802 and the integrated hard disk drive 821 can be provided in substitute for the hard disk drive 103 and the disk controller 124. Here, the integrated hard disk drive 821 is provided so that the storage capacity of the flash memory 405 will be less in comparison to the storage capacity of the hard disk drive 103. Even when adopting this kind of configuration, the same effect as this embodiment can be obtained. A case of setting the storage capacity of the hard disk drive 103 of the integrated hard disk drive 821 to 200 Bytes, and setting the storage capacity of the flash memory 405 of the integrated hard disk drive 821 to 20 Bytes is now considered.

Figure 23:
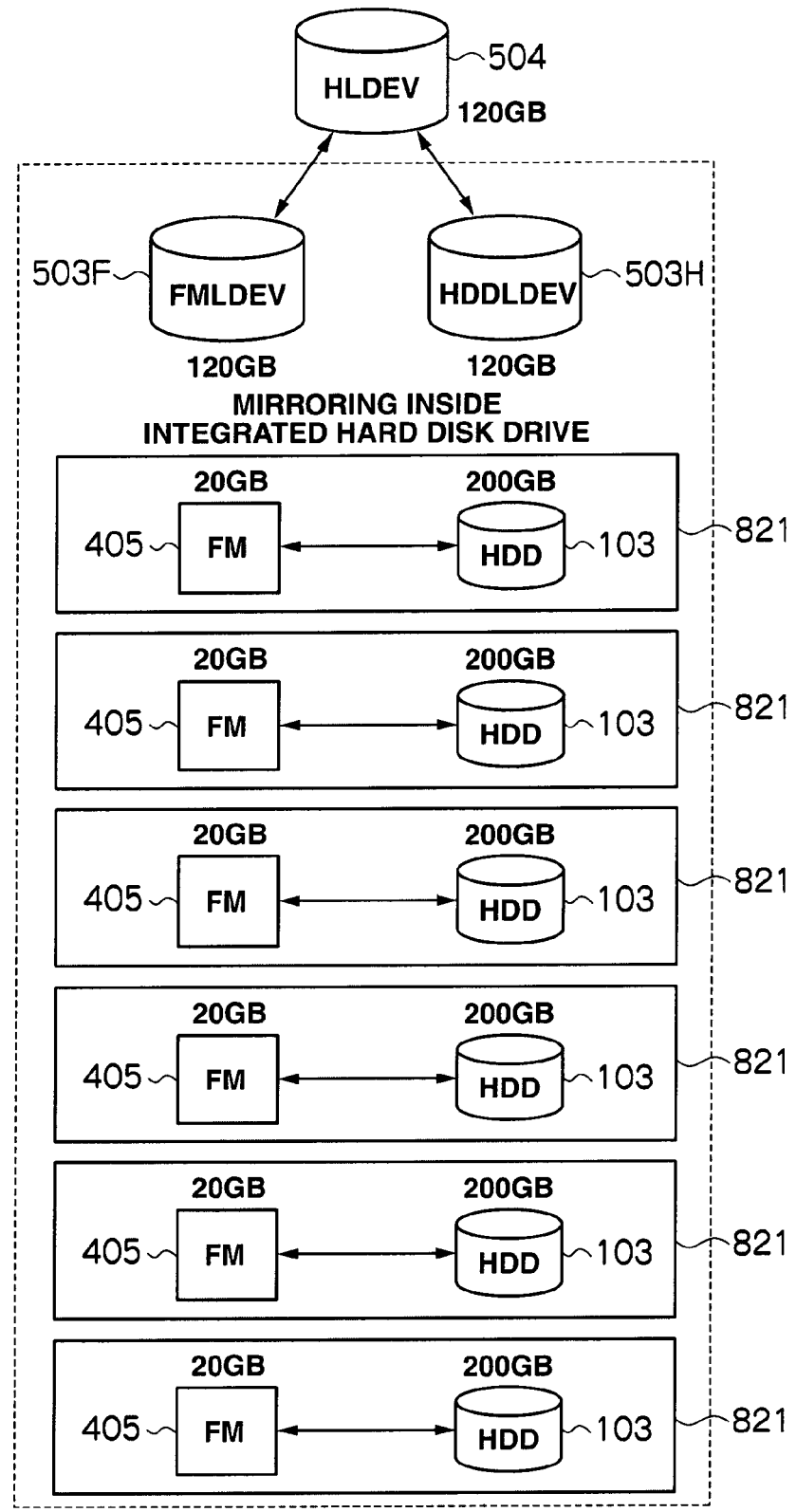
FIG. 23 is a conceptual diagram explaining the correspondence of a HLDEV and a LDEV created inside the storage controller according to another embodiment of the present invention.

In this case, for example, as shown in FIG. 23, even when pair-configuring the FMLDEV 503F and the HDDLDEV 503H upon setting the HLDEV 504 to 120 GBytes, setting the FMLDEV 503F to 120 GBytes, and setting the HDDLDEV 503H to 120 GBytes, and mirroring is only performed between the 20 Gbyte storage capacity of the flash memory 405 in the integrated hard disk drive 821 and the 20 Gbyte storage capacity of the hard disk drive 103 in the integrated hard disk drive 821, the same effect as this embodiment can be obtained.

Figure 24:
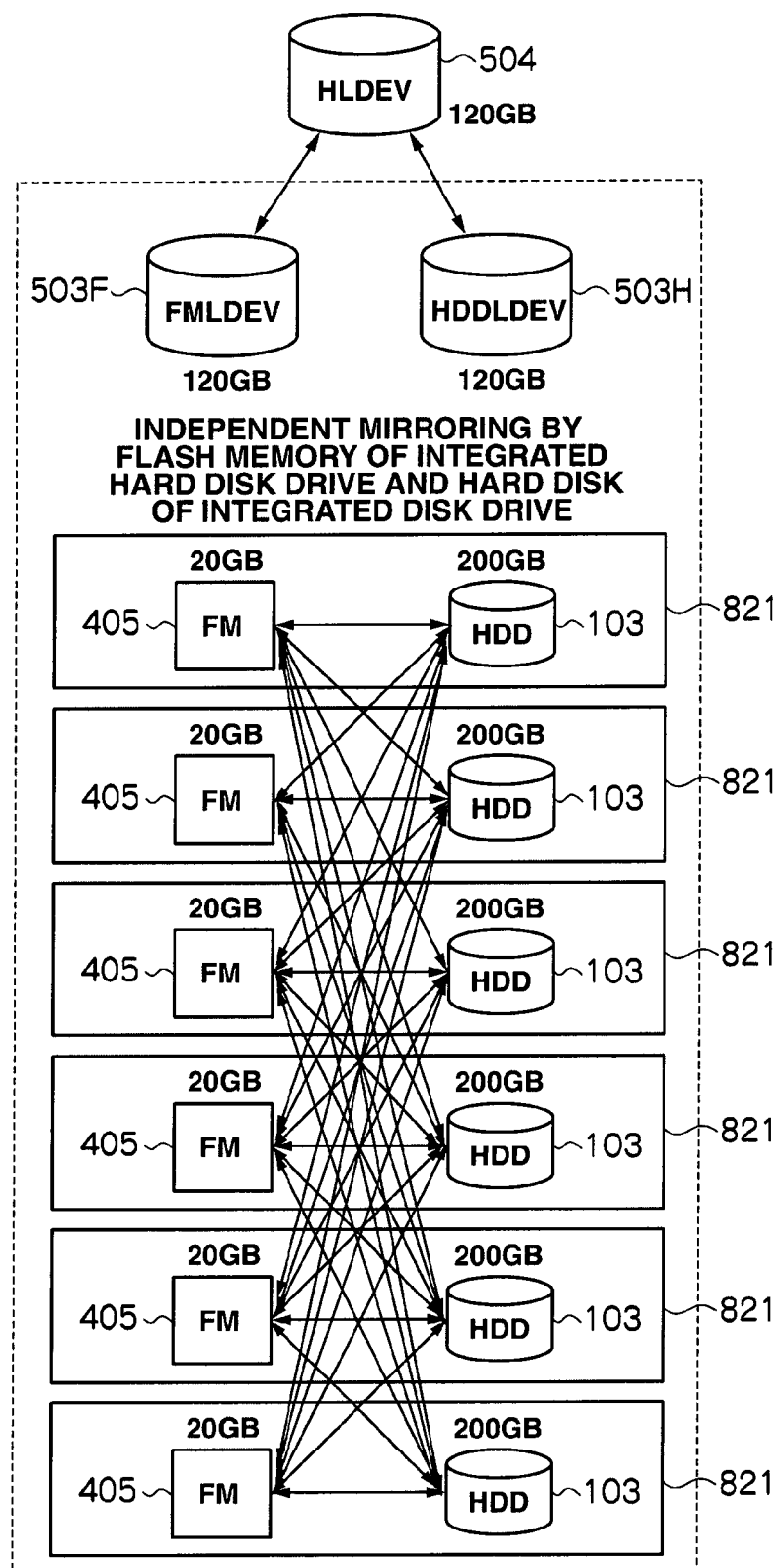
FIG. 24 is a conceptual diagram explaining the correspondence of a HLDEV and a LDEV created inside the storage controller according to another embodiment of the present invention.

Further, for example, as shown in FIG. 24, even when pair-configuring the FMLDEV 503F and the HDDLDEV 503H upon setting the HLDEV 504 to 120 GBytes, setting the FMLDEV 503F to 120 GBytes, and setting the HDDLDEV 503H to 120 GBytes, and mirroring is performed independently to the 20 Gbyte storage capacity of the flash memory 405 in the integrated hard disk drive 821 and the 20 Gbyte storage capacity of the hard disk drive 103 in another integrated hard disk drive 821, the same effect as this embodiment can be obtained.

Figure 25:
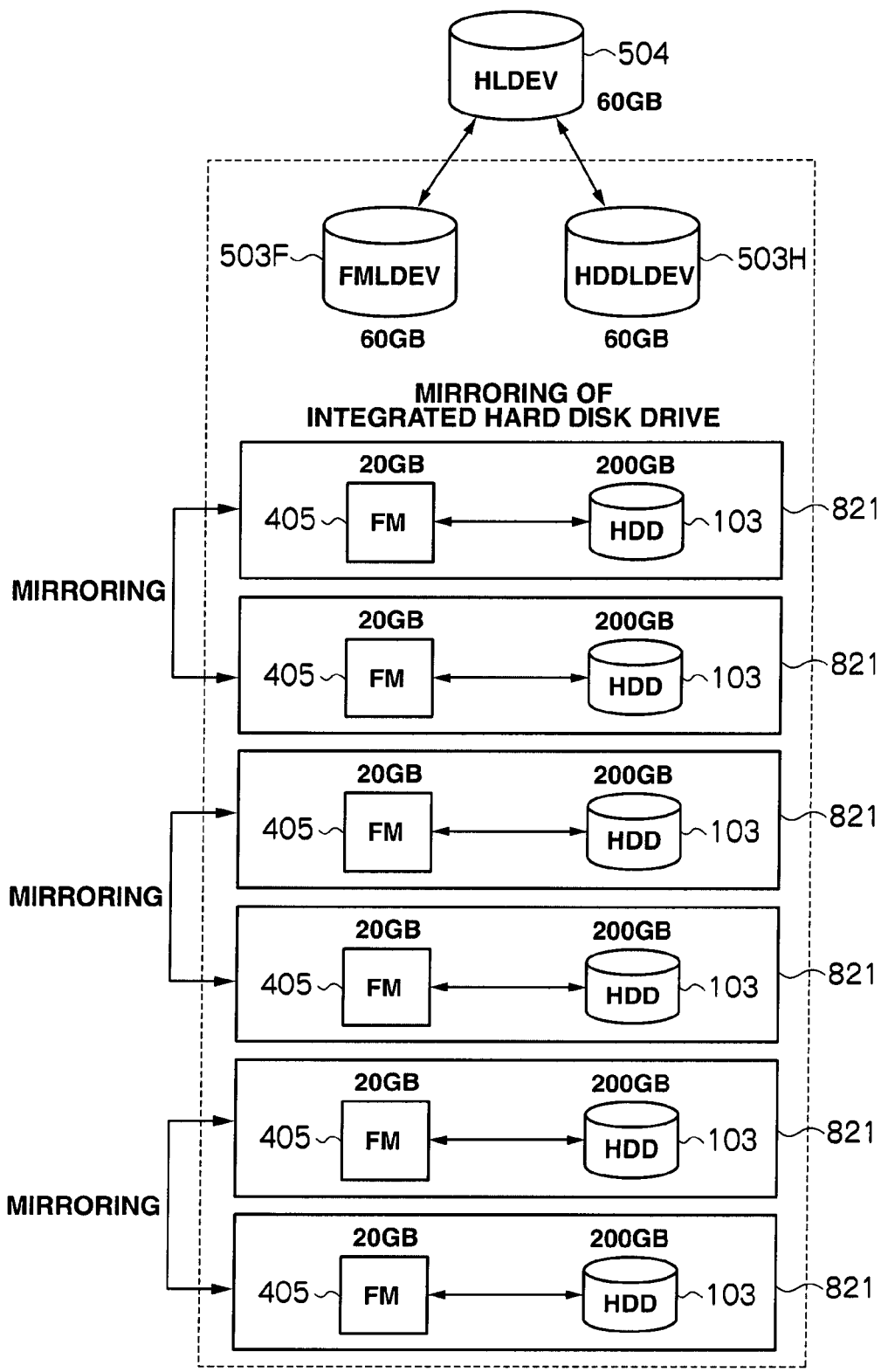
FIG. 25 is a conceptual diagram explaining the correspondence of a HLDEV and a LDEV created inside the storage controller according to another embodiment of the present invention.

Further, for example, as shown in FIG. 25, even when setting the HLDEV 504 to 60 GBytes, setting the FMLDEV 503F to 60 GBytes, and setting the HDDLDEV 503H to 60 GBytes, mirroring is only performed between the 20 Gbyte storage capacity of the flash memory 405 in the integrated hard disk drive 821 and the Gbyte storage capacity of the hard disk drive 103, and subjecting the integrated hard disk drive 821 to mirroring control, the same effect as this embodiment can be obtained. The same effect as the present invention can be obtained in various other configurations.

Moreover, although this embodiment explained a case of allocating the LDEV 503 configured from the flash memory 405 to the HLDEV 504 in at least one level of redundancy, the present invention is not limited thereto, and the LDEV 503 configured from the flash memory 405 can be allocated to the HLDEV 504 in a zero redundancy level; that is, it is possible to allocate only the LDEV 503 configured from the flash memory 405.

Further, although this embodiment explained a case of reading the read-target data stored in the hard disk drive 103 of the HDDLDEV 503H from which the read-target data should be read when such read-target data is not stored in the flash memory 405 of the FMLDEV 503F (S26: NO), the present invention is not limited thereto, and such read-target data may also be read into the cache memory unit 122.

Moreover, although this embodiment explained a case of providing a flash memory 405 for storing data, the present invention is not limited thereto, and, for instance, various other nonvolatile memories such as a phase-change memory or a semiconductor memory may also be used.

Further, although this embodiment explained a case of using a hard disk drive 103 as the disk-shaped memory device with a greater data write cycle in comparison to the flash memory 405, the present invention is not limited thereto, and, for instance, various other disk-shaped memory devices such as an optical disk or a magnet-optical disk may also be used.

In addition, the present embodiment can also be applied to a storage system 100 configured from a storage controller storing data in one or more disk devices or storage mediums, or from a storage apparatus utilizing a solid-state disk device such as a plurality of storage controllers, a tape library controller, an optical disk library controller, and a semiconductor disk controller, and a nonvolatile memory as represented by a flash memory.

The present invention can be broadly applied to a storage apparatus that drives one or more hard disk drives for storing data.

We claim:

1. A storage apparatus that provides to a host computer a logical device for storing data sent from said host computer, comprising:
    a nonvolatile memory for storing said data;
    a hard disk drive (HDD) for storing said data;
    a controller for controlling said nonvolatile memory and said HDD,
    wherein said controller configures said logical device with a first logical volume corresponding to said nonvolatile memory and a second logical volume corresponding to said HDD, in which said first logical volume is a primary volume and said second logical volume is a secondary volume,
    wherein said controller controls to manage a power mode of said HDD and an operating time of said HDD in power on mode, and
    wherein if said controller receives an access request to said logical device from said host computer, said controller controls to read/write data from/to said first logical volume, power on of said HDD and asynchronously copy data from said first logical volume to said second logical volume at a predetermined time period; and
    a memory that stores first information including at least one of a total number of power on/off of said HDD and a total operating time of said HDD,
    wherein said controller controls said power mode of said HDD based on said first information, so that said HDD is able to be used for a long time of duration of use.

2. The storage apparatus according to claim 1, wherein said controller controls to power off of said HDD after said asynchronous copy.

3. The storage apparatus according to claim 1, further comprising:
    a memory that stores second information including at least one of a total write count of said nonvolatile memory, a total erase count of said nonvolatile memory, a number of defective blocks of said nonvolatile memory, and average erase time of said nonvolatile memory,
    wherein said controller determines whether at least one value of said second information exceeds a predetermined threshold.

4. The storage apparatus according to claim 3, wherein if said controller determines said at least one value of said second information exceeds said predetermined threshold, said controller controls to increase an operation time of said HDD.

5. A control method of a storage apparatus that provides to a host computer a logical device for storing data sent from said host computer, comprising:
    configuring said logical device with a first logical volume corresponding to a nonvolatile memory and a second logical volume corresponding to a hard disk drive (HDD) by a controller, in which said first logical volume is a primary volume and said second logical volume is a secondary volume;
    controlling to manage a power mode of said HDD and an operating time of said HDD in power on mode,
    wherein if an access request to said logical device from said host computer is received, controlling, by said controller, to read/write data from/to said first logical volume, power on of said HDD and asynchronously copy data from said first logical volume to said second logical volume at a predetermined time period;
    storing, by a memory, that stores a first information including at least one of a total number of power on/off of said HDD and a total operating time of said HDD, HDD; and
    controlling, by wherein said controller, controls said power mode of said HDD based on said first information, so that said HDD is able to be used for a long time of duration of use.

6. The control method according to claim 5, controlling, by said controller, to power off said HDD after said asynchronous copy.

7. The control method according to claim 5, further comprising:
    storing, by a memory, a second information including at least one of a total write count of said nonvolatile memory, a total erase count of said nonvolatile memory, a number of defective blocks of said nonvolatile memory, and average erase time of said nonvolatile memory; and determining, by said controller, whether at least one value of said second information exceeds a predetermined threshold.

8. The control method according to claim 7, further comprising:

if said controller determines said at least one value of said second information exceeds said predetermined threshold, controlling, by said controller, to increase an operation time of said HDD.

* * * * *